(12) United States Patent
Esser et al.

(10) Patent No.: US 8,992,014 B2
(45) Date of Patent: Mar. 31, 2015

(54) METHOD FOR CALCULATING A SPECTACLE LENS WITH IMPROVED NEAR ZONE

(75) Inventors: Gregor Esser, Munich (DE); Wolfgang Becken, Munich (DE); Helmut Altheimer, Baisweil-Lauchdorf (DE); Andrea Welk, Munich (DE); Anne Seidemann, Munich (DE); Edda Wehner, Emmering (DE); Werner Mueller, Oetisheim (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 65 days.

(21) Appl. No.: 13/990,202

(22) PCT Filed: Sep. 6, 2011

(86) PCT No.: PCT/EP2011/004485
§ 371 (c)(1),
(2), (4) Date: May 29, 2013

(87) PCT Pub. No.: WO2012/072156
PCT Pub. Date: Jun. 7, 2012

(65) Prior Publication Data
US 2013/0265540 A1    Oct. 10, 2013

(30) Foreign Application Priority Data
Nov. 30, 2010 (DE) .......................... 10 2010 052 936

(51) Int. Cl.
*G02C 7/02* (2006.01)
*G02C 7/06* (2006.01)
(52) U.S. Cl.
CPC ................ *G02C 7/028* (2013.01); *G02C 7/027* (2013.01); *G02C 7/061* (2013.01); *G02C 7/024* (2013.01)
USPC .................................. 351/159.76; 351/159.52

(58) Field of Classification Search
CPC ........ G02C 7/024; G02C 7/025; G02C 7/027; G02C 7/028
USPC ........................... 351/159.52, 159.73–159.76
See application file for complete search history.

(56) References Cited

U.S. PATENT DOCUMENTS

2003/0107702 A1    6/2003  Yamakaji
2011/0299032 A1*  12/2011  Becken et al. ................. 351/177

FOREIGN PATENT DOCUMENTS

| DE | 102008057205 | 5/2010 |
| DE | 102008057206 | 5/2010 |
| WO | WO 2008/089998 | 7/2008 |
| WO | WO 2010/005817 | 5/2010 |

OTHER PUBLICATIONS

International Search Report issued for PCT/EP2011/004485 date of mailing:.Dec. 8, 2011.

* cited by examiner

*Primary Examiner* — Darryl J Collins
(74) *Attorney, Agent, or Firm* — Schiff Hardin LLP

(57) ABSTRACT

Optimization and production of a spectacle lens for a specific wearing situation for correcting at least one astigmatic refraction of an eye of a spectacles wearer, which in a reference viewing direction of the eye has a cylinder reference value and a cylinder reference axis, comprising: specifying an object distance for at least one evaluation point of the spectacle lens; determining a transformed astigmatic refraction for the at least one evaluation point of the spectacle lens from the cylinder reference value and the cylinder reference axis depending on the specified object distance; and optimizing the spectacle lens such that for the at least one evaluation point a correction of the transformed astigmatic refraction by the spectacle lens in the specific wearing situation is taken into consideration, wherein determining the transformed astigmatic refraction comprises determining a transformed cylinder value and/or a transformed cylinder axis depending on the specified object distance.

12 Claims, 11 Drawing Sheets

Figure 1:
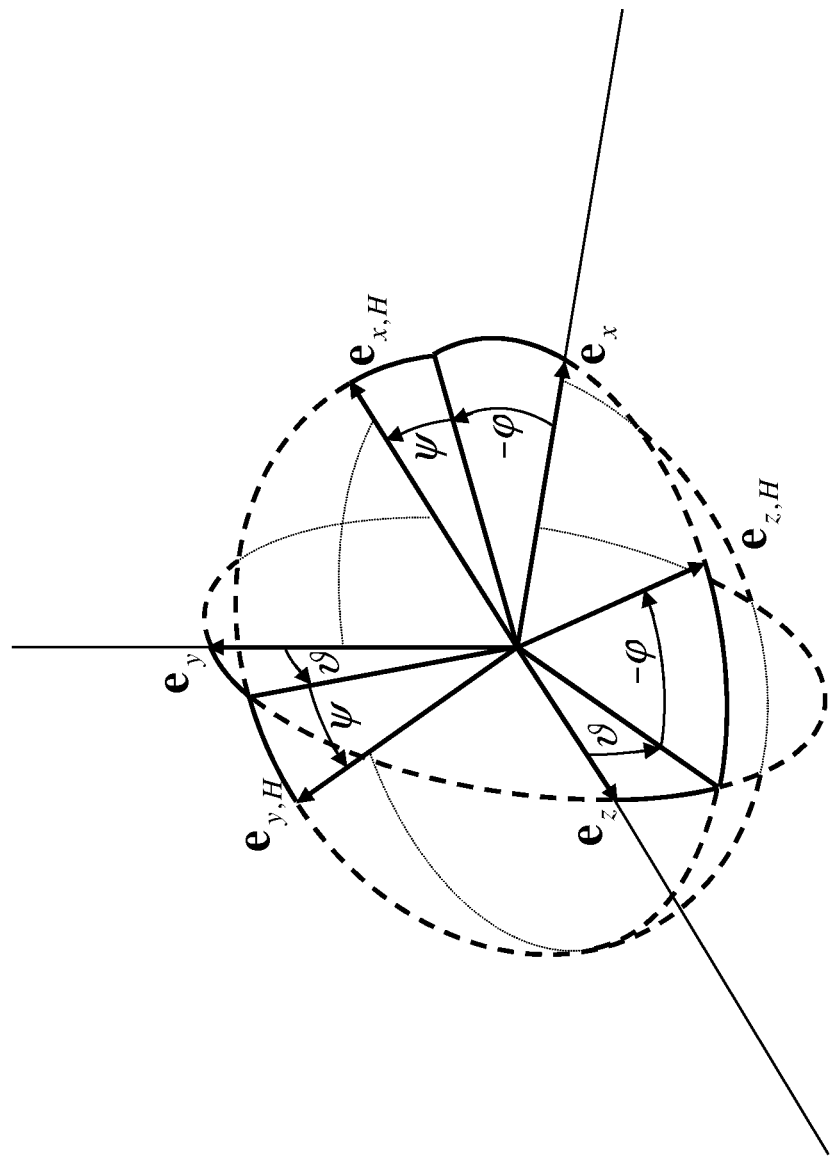

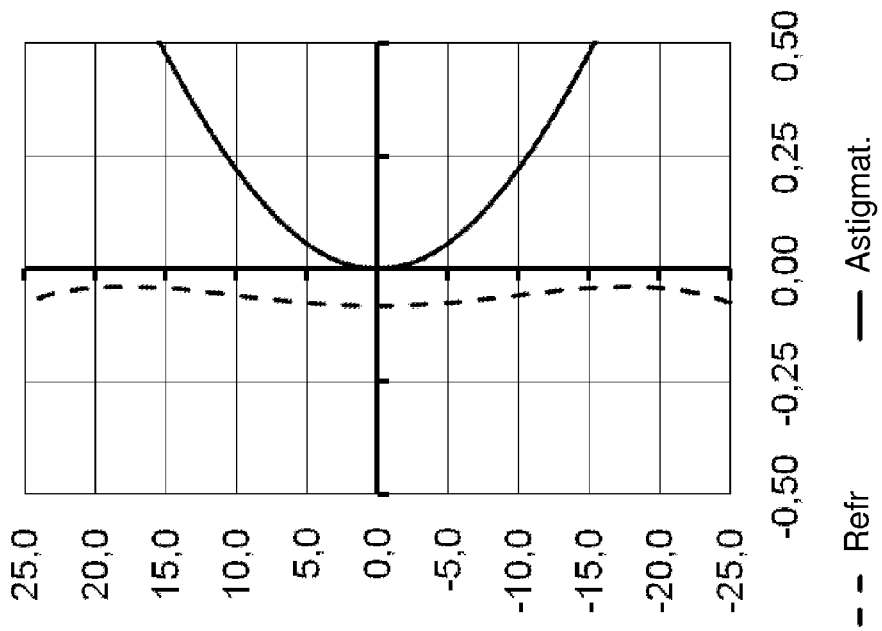
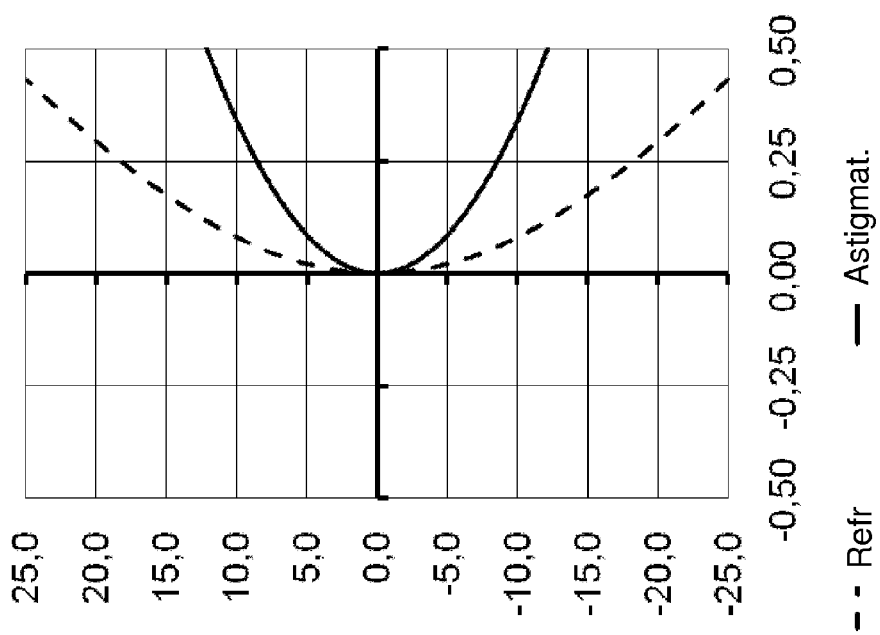

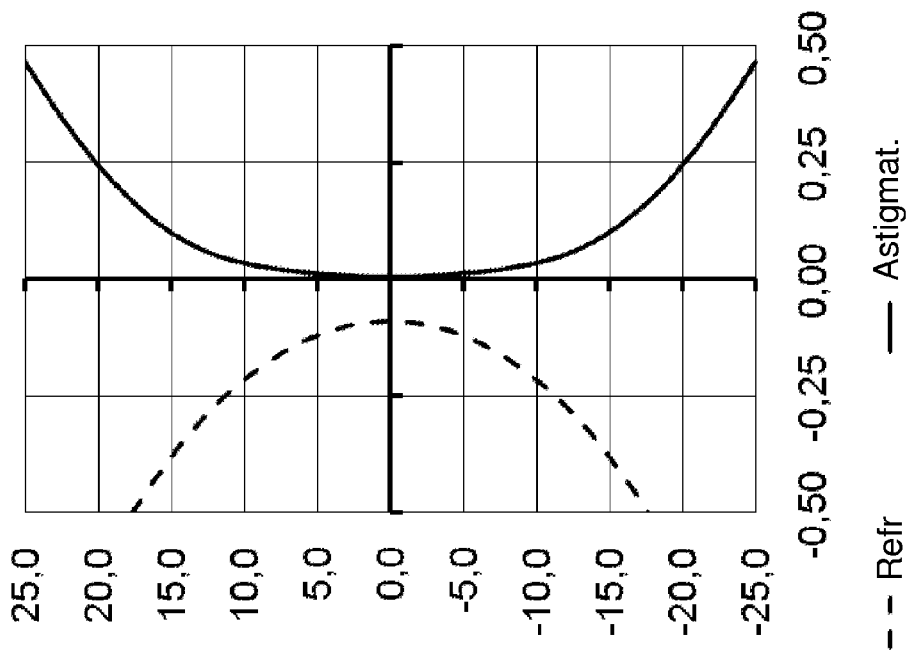
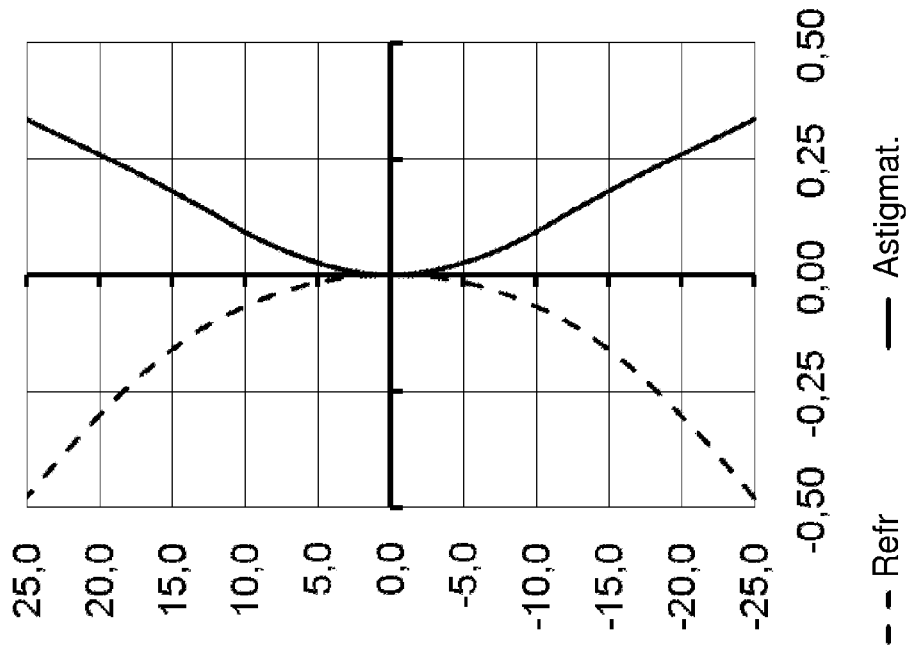

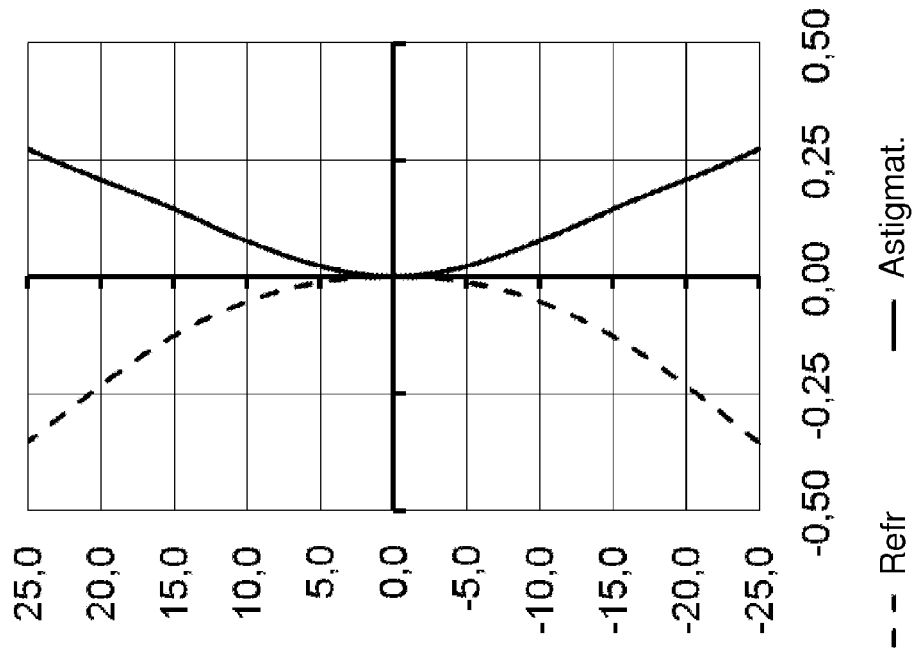
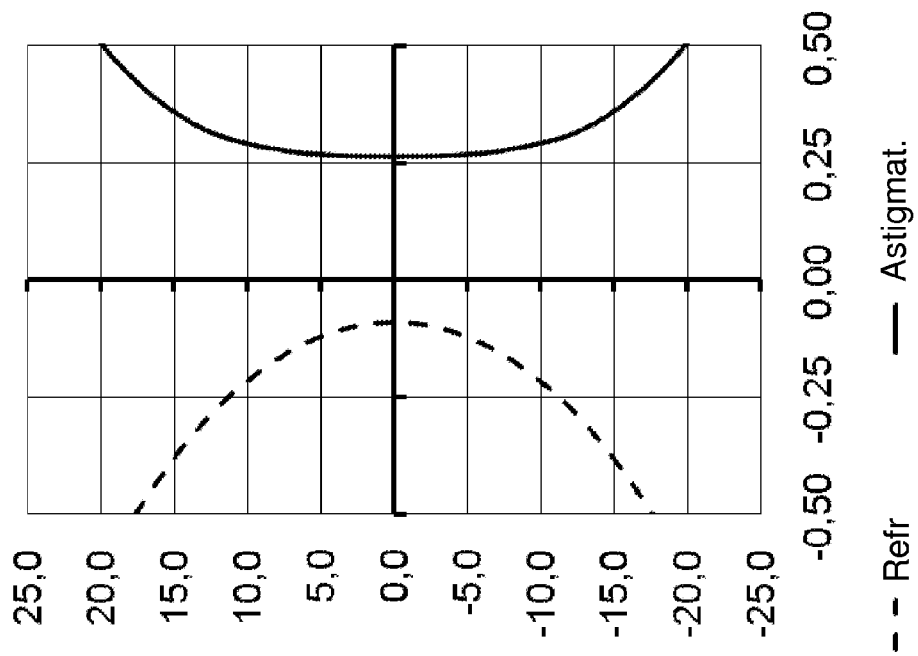

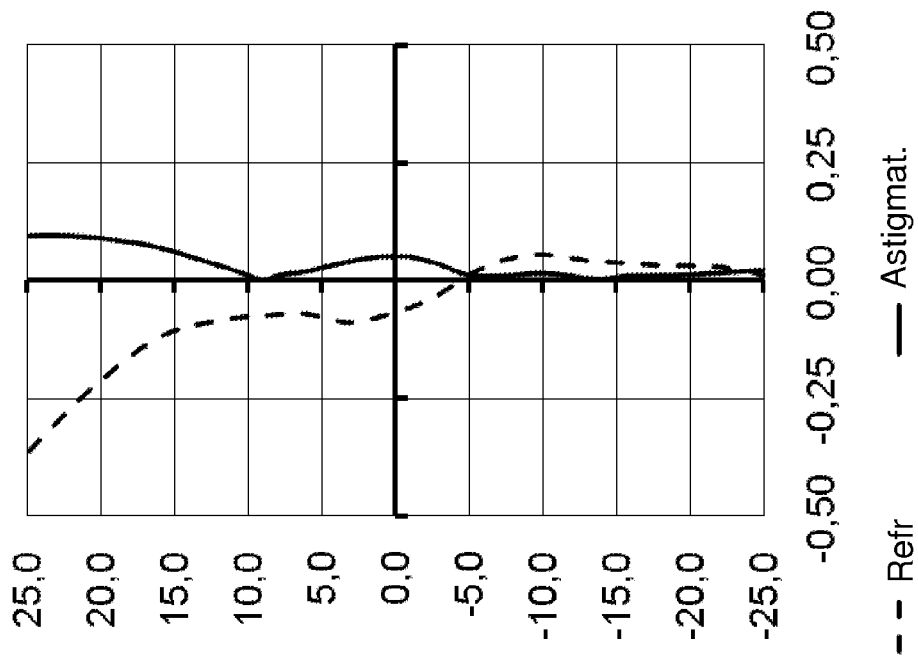
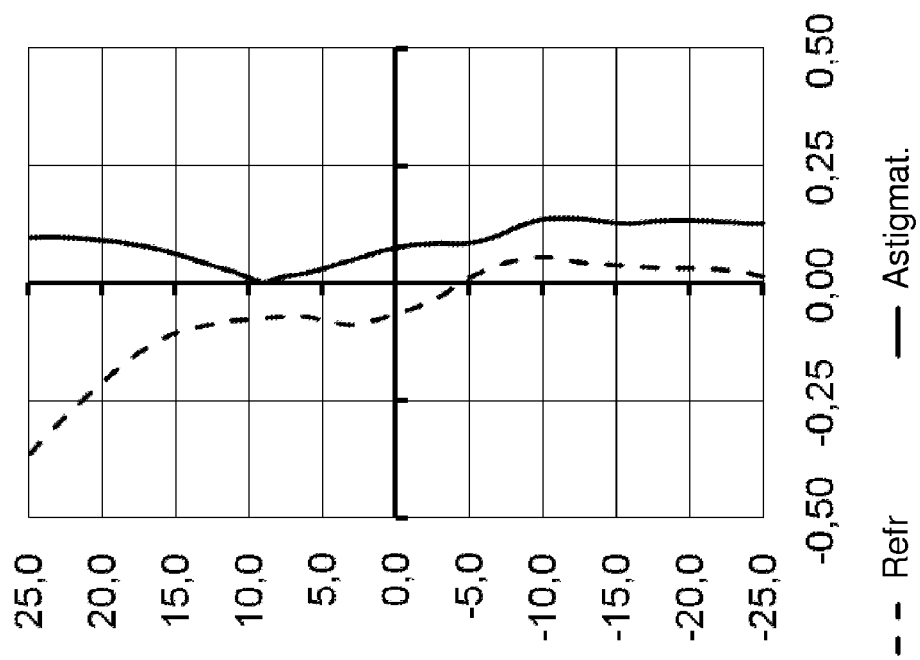

METHOD FOR CALCULATING A SPECTACLE LENS WITH IMPROVED NEAR ZONE

The present invention relates to a method for optimizing and producing a spectacle lens for correcting an astigmatic refraction of an eye of a spectacles wearer. Further, the invention relates to a computer program product, a storage medium, and a device for producing a spectacle lens for correcting an astigmatic refraction of an eye of a spectacles wearer.

For the production and optimization of spectacle lenses, in particular of individual spectacle lenses, each spectacle lens is manufactured such that the best possible correction of a refractive error of the respective eye of the spectacles wearer is achieved for every desired viewing direction or every desired object point. In general, a spectacle lens can be said to be fully correcting for a specific viewing direction when the values of sphere, cylinder, and axis of the wavefront upon passing the vertex sphere match with the values of sphere, cylinder, and axis of the prescription for the eye having the visual defect. In the refraction determination for an eye of a spectacles wearer, dioptric values (sphere, cylinder, cylinder axis) for a far (usually infinite) distance and optionally (for multifocal-lenses or progressive lenses) an addition for a near distance (e.g. according to DIN 58208) are determined. This specifies the prescription (sphere, cylinder, cylinder axis, and optionally addition) to be sent to a spectacles producer. For modern spectacle lenses, object distances deviating from the standard, which are used in the refraction determination, can be indicated in addition.

A full correction for all viewing directions at the same time is not possible in the normal case though. Therefore, the spectacle lenses are manufactured such that especially in the main zones of use, in particular in the central visual zones, they cause a good correction of visual defects of the eye and only minor aberrations, whereas higher aberrations are permitted in peripheral zones.

In order to be able to manufacture a spectacle lens is this way, at first a calculation of the spectacle lens surfaces or of at least one of the spectacle lens surfaces is performed such that the desired distribution of the unavoidable aberrations is caused thereby. This calculation and optimization is usually performed by means of an iterative variation method by minimization of a target function. As a target function, in particular a function F with the following functional connection to the spherical power S, the amount of the cylindrical power Z, and the axial angle of the cylinder α (also referred to as a "SZA" combination) is considered and minimized:

$$F = \sum_{i=1}^{m} [g_{i,S\Delta}(S_{\Delta,i} - S_{\Delta,i,target})^2 + g_{i,Z\Delta}(Z_{\Delta,i} - Z_{\Delta,i,target})^2 + \ldots ].$$

In the target function F at the evaluation points i of the spectacle lens, at least the actual refractive deficits of the spherical power $S_{\Delta,i}$ and of the cylindrical power $Z_{\Delta,i}$ as well as target specifications for the refractive deficits of the spherical power $S_{\Delta,i,target}$ and of the cylindrical power $Z_{\Delta,i,target}$ are taken into consideration. The respective refractive deficits at the respective evaluation points are preferably taken into consideration with weighting factors $g_{i,S\Delta}$ and $g_{i,Z\Delta}$. Here, the target specifications for the refractive deficits of the spherical power $S_{\Delta,i,target}$ and/or of the cylindrical power $Z_{\Delta,i,target}$ in particular together with the weighting factors $g_{i,S\Delta}$ and $g_{i,Z\Delta}$, respectively, constitute the so-called spectacle lens design. In addition, particularly further residues, particularly further parameters to be optimized, such as coma and/or spherical aberration and/or prism and/or magnification and/or anamorphic distortion, etc. can be taken into consideration, which is particularly indicated by the expression "+ . . . ".

If one considers the ray tracing through a specific visual point i, i.e. a specific evaluation point of the corresponding spectacle lens, in the spectacle lens calculation, then the wavefront has a specific SZS combination at the vertex sphere. It is the aim of this spectacle lens optimization to make this SZA combination match with the SZA combination of the refraction determination in the best possible way. Since this is usually not possible simultaneously at all visual points i at the same time, a function F is set up as a target function, the minimization of which yields a best possible compromise over all evaluation points or visual points i.

A basic procedure for determining the refractive deficit is described in Diepes H., Blendowske R. "Optik and Technik der Brille", Optische Fachveröffentlichung GmbH, Heidelberg (2002), particularly pages 481 ff., for example. To this end, the so-called refractive power matrix or vergence matrix S is considered, which is connected with the values for the spherical power S, the amount of the cylindrical power Z, and the axial angle of the cylinder α as follows:

$$S = \begin{pmatrix} S_{xx} & S_{xy} \\ S_{xy} & S_{yy} \end{pmatrix}$$

$$= \begin{pmatrix} \left(S + \frac{Z}{2}\right) - \frac{Z}{2}\cos 2\alpha & -\frac{Z}{2}\sin 2\alpha \\ -\frac{Z}{2}\sin 2\alpha & \left(S + \frac{Z}{2}\right) + \frac{Z}{2}\cos 2\alpha \end{pmatrix}$$

$$Z = \sqrt{(S_{xx} - S_{yy})^2 + 4S_{xy}^2}$$

$$\Leftrightarrow S = \frac{1}{2}(S_{xx} + S_{yy} - Z)$$

$$\tan\alpha = \frac{S - S_{xx}}{S_{xy}}$$

The vergence matrix S is determined for the SZA values $S_{SK}, Z_{SK}, \alpha_{SK}$ at the vertex sphere on the one hand, and for the SZA values $S_{Ref}, Z_{Ref}, \alpha_{Ref}$ obtained by the refraction determination for the corresponding eye of the spectacles wearer on the other hand. This results in $S_{SK}$ and $S_{Ref}$. Illustratively speaking, $S_{SK}$ basically describes the local power of the spectacle lens, whereas $S_{Ref}$ describes the power desired for the spectacles wearer in the ideal case.

For an ideal image formation, it should be required that $S_{SK}$ and $S_{Ref}$ match, which is not possible for all evaluation points of a spectacle lens at the same time though. Thus, $$S_\Delta = S_{SK} - S_{Ref}$$

$$= \begin{pmatrix} S_{SK,xx} & S_{SK,xy} \\ S_{SK,xy} & S_{SK,yy} \end{pmatrix} - \begin{pmatrix} S_{Ref,xx} & S_{Ref,xy} \\ S_{Ref,xy} & S_{Ref,yy} \end{pmatrix}$$

$$= \begin{pmatrix} S_{SK,xx} - S_{Ref,xx} & S_{SK,xy} - S_{Ref,xy} \\ S_{SK,xy} - S_{Ref,xy} & S_{SK,yy} - S_{Ref,yy} \end{pmatrix}$$

remains as the difference matrix, which is usually different from zero. According to the above-illustrated definition of the vergence matrix, the difference matrix $S_\Delta$ is assigned corresponding SZA values as the refractive deficit:

$$Z_\Delta = \sqrt{\frac{((S_{SK,xx} - S_{Ref,xx}) - (S_{SK,yy} - S_{Ref,yy}))^2 +}{4(S_{SK,xy} - S_{Ref,xy})^2}}$$

$$S_\Delta = \frac{1}{2}((S_{SK,xx} - S_{Ref,xx}) + (S_{SK,yy} - S_{Ref,yy}) - Z_\Delta)$$

$$\tan\alpha_\Delta = \frac{S_\Delta - (S_{SK,xx} - S_{Ref,xx})}{S_{SK,xy} - S_{Ref,xy}}$$

Since the degree of unsharpness of the image in the case of a non-vanishing $S_\Delta$ particularly only depends on $S_\Delta$ and $Z_\Delta$ (but particularly not on $\alpha_\Delta$), an optimization is performed preferably only with respect to $S_\Delta$ and $Z_\Delta$. The axial angle of the wavefront and the transformed refraction are both taken into account though. Note that if $S_\Delta=0$ and $Z_\Delta=0$, it follows that $S_{SK}=S_{Ref}$, $Z_{SK}=Z_{Ref}$ and $\alpha_{SK}=\alpha_{Ref}$. Explicitly, it holds that:

$$Z_\Delta = \sqrt{Z_{SK}^2 + Z_{Ref}^2 - 2Z_{SK}Z_{Ref}\cos(2(\alpha_{SK}-\alpha_{Ref}))}$$

$$S_\Delta = S_{SK} - S_{Ref} + \frac{1}{2}((Z_{SK}-Z_{Ref})-Z_\Delta)$$

This shows how the axial angle is taken into account in the parameters $S_\Delta$ and $Z_\Delta$. A change of the axial angle, or cylinder axis, by the angle $\delta\alpha_{SK}$ has the effect that $\cos(2(\alpha_{SK}+\delta\alpha_{SK}-\alpha_{Ref}))$ instead of $\cos(2(\alpha_{SK}-\alpha_{Ref}))$ is under the root. The optimization is performed with the target function in that each of the parameters $S_{\Delta,i}$, $Z_{\Delta,i}$ is assigned a target value $S_{\Delta,i,target}$ and $Z_{\Delta,i,target}$, respectively, preferably at each visual point i, and that subsequently the target function is minimized. For a better understanding of the procedure, reference is made to the article by W. Becken, A. Seidemann, H. Altheimer, G. Esser and D. Uttenweiler "Brillengläser im Sport: Optimierung der Abbildungseigenschaften unter physiologischen Aspekten", Z. Med. Phys. 17 (2007), 56-66.

For a correction of an astigmatic refraction of an eye, knowledge of both the amount of the astigmatic refraction, i.e. the value of the cylinder, and of the axial angle thereof is crucial. In order to correct an astigmatic refraction of the eye, these values for the eye to be corrected are measured while the eye is in a measurement position or reference viewing direction, in particular zero viewing direction. Preferably, a coordinate system is specified and the axial angle of the astigmatic refraction with respect to this coordinate system is determined. The amount of the astigmatism can be indicated as the difference of the principal refractive powers. The coordinate system can be a Cartesian coordinate system with the axes $e_x$, $e_y$, and $e_z$, for example, its coordinate origin particularly being in the ocular center of rotation of the eye to be corrected. Here, the axis $e_z$ is preferably parallel to the reference viewing direction, in particular to the zero viewing direction, and is oriented in the direction of the main ray. Preferably, the axis $e_z$ is a horizontal axis, which, with respect to the eye, faces rearward in the zero viewing direction, i.e. in the direction of the light ray. The axis $e_x$ is e.g. horizontal and perpendicular to the axis $e_z$, in particular perpendicular to the reference viewing direction or zero viewing direction. Eventually, the axis $e_y$ is perpendicular to the other two axes and is particularly oriented vertically upward. Thus, the three axes $e_x$, $e_y$, and $e_z$ form a base coordinate system, for example, in which the axial angle of an astigmatism to be corrected can be described as well.

When looking through a spectacle lens, the pair of eyes constantly performs eye movements, whereby the visual points within the spectacle lens change. Thus, eye movements constantly cause changes in the image formation properties, in particular in the aberrations for the spectacle lens. Moreover, upon eye movements, each eye also performs an accommodation to the changed object distance and a torsion about the momentary axis of the viewing direction, depending on the position and the distance of an object to be observed. In the case of an astigmatic refraction of the eye, this often leads to an unsatisfactory correction of the astigmatism in particular in the near zone.

Normally, the actual values of the spectacle lens are put together with the prescription data at the vertex sphere, since the prescription data (refraction data) are also present in the plane of the trial case lens. However, this is imprecise for near vision, since the accommodation is not performed at the vertex sphere, but only at the location of the eye lens. The wavefront, and here particularly the cylindrical component of the wavefront, changes in the propagation from the spectacle lens to the eye lens though. Therefore, the amount of the cylinder to be corrected changes in the spectacle lens plane (vertex sphere) for near vision, i.e. when near objects are looked at. This is the case even if the accommodation is performed completely spherically. This so-called adjustment astigmatism is described in the book "Methoden der Refraktionsbestimmung" by Kunibert Krause, for example.

In order to improve the optical properties particularly for the use of a spectacle lens or a spectacle lens pair for near vision, WO 2010/054817 A1 suggests using a transformed astigmatic refraction instead of the value of the astigmatic refraction measured in the refraction determination for distance vision in the target function F in the optimization of the spectacle lens, a transformation of the axial angle of the astigmatic refraction dependent on the viewing direction of the other eye being performed in the transformed astigmatic refraction. Thus, for each visual point of the spectacle lens to be produced, which is taken into account in the target function as an evaluation point i for the optimization of the spectacle lens, in addition to the viewing direction of the eye belonging to this visual point, the corresponding viewing direction of the other eye is calculated as well, particularly taking the optical properties of the other spectacle lens into consideration. Depending on the viewing directions of both eyes, a corresponding torsion correction for the axial angle of the astigmatism is calculated and considered in the target function. This leads to a substantial improvement of the optical properties of the spectacle lens in particular for use in the near zone, without increasing the refraction determination effort considerably. However, the calculation of the transformed axial angle, which comprises a calculation of the two corresponding main rays for each evaluation point, leads to a prolonged calculation time.

It therefore is the object of the invention to obtain a simple and fast, and thus low-cost optimization and production of a spectacle lens for a good correction of an astigmatic refraction particularly for use of the spectacle lens in the near zone in the best possible way. This object is solved as indicated in the independent claims. Preferred embodiments are subject of the dependent claims.

In particular, the invention provides a method for optimizing and producing a spectacle lens for a specific wearing situation for correcting at least one astigmatic refraction of an eye of a spectacles wearer, which in a reference viewing direction $-e_z$ of the eye has a cylinder value (hereinafter referred to as a cylinder reference value $Z_0$) and an axial angle (hereinafter referred to as cylinder reference axis $\alpha_0$), i.e. a cylinder axis of the eye refraction of the eye when the eye is in the reference viewing direction. The method comprises a calculation and optimization step of the spectacle lens, i.e. of at least one surface or a surface region of the spectacle lens, which comprises:

specifying an object distance $a_i$ for at least one evaluation point $i_b$ of the spectacle lens for a viewing direction $-e_\zeta$ of the eye deviating from the reference viewing direction $-e_z$;

determining a transformed astigmatic refraction for the at least one evaluation point $i_b$ of the spectacle lens from the cylinder reference value $Z_0$ and the cylinder reference axis $\alpha_0$ depending on the specified object distance $a_i$; and optimizing the spectacle lens such that for the at least one evaluation point $i_b$ a correction of the transformed astigmatic refraction by the spectacle lens in the specific wearing situation is taken into consideration, wherein determining the transformed astigmatic refraction comprises determining a transformed cylinder value $Z_i$ and/or a transformed cylinder axis $\alpha_i$ depending on the specified object distance $a_i$.

In particular, the refraction determination for the spectacles wearer can be performed in a conventional manner without additional effort. Thus, the dioptric values (sphere, cylinder, cylinder axis) for a far (usually infinite) distance and optionally (for multifocal-lenses or progressive lenses) an addition for a near distance (e.g. according to DIN 58208) can be determined in a proven manner and be provided particularly for the individual optimization and production of a spectacle lens. Different from the conventional procedure in the optimization and production of a spectacle lens, the prescription data (sphere, cylinder, cylinder axis, and optionally addition) determined in the refraction determination are not directly taken into consideration for the correction by the spectacle lens in all visual points (evaluation points) of the spectacle lens. Instead, they represent the prescription data to be considered for a reference viewing direction, in particular a distance reference point of the spectacle lens. To obtain an improvement of the optical properties in the near zone, the astigmatic refraction determined in the refraction determination for the spectacles wearer is transformed particularly for visual points in the near zone, as will be defined more precisely in the following. This transformation is performed independently for each eye or spectacle lens and depending on an object distance for the corresponding visual point of the spectacle lens. Thus, an improvement of the optical properties of the spectacle lens can be obtained particularly in the near zone without increasing the refraction determination effort substantially.

Preferably, a stationary or object-fixed base coordinate system for the eye is specified, as has been described above by way of example. In the base coordinate system, preferably the cylinder axis of an astigmatic refraction of the eye is individually determined in the reference viewing direction by an optician or ophthalmologist for a patient or spectacles wearer and provided as the cylinder reference axis for the method for optimizing and producing the spectacle lens for correcting the astigmatic refractions. In a preferred embodiment, the reference viewing direction of the eye is the zero viewing direction and goes horizontally straight on into the distance or into infinity. It is thus parallel to the third base coordinate axis $e_z$ of the eye, wherein it is oppositely oriented in a preferred convention, which is to be expressed by the minus sign. This convention is to apply to the viewing direction $-e_\zeta$ as well, which is why this viewing direction is parallel to the eye-side main ray and oriented oppositely with respect thereto. The cylinder axis can be expressed with respect to the other two coordinate axes, for example.

Thus, starting from the astigmatic refraction of the eye to be corrected in the reference viewing direction, which can be measured or determined by an optician in the known manner, for example, a transformation, which depends on the object distance specified in the specific wearing situation, is performed in order to obtain the transformed astigmatic refraction. Preferably, the transformed astigmatic refraction is indicated like the astigmatic refraction in the reference viewing direction in the form of a cylinder value (in particular as a scalar parameter with the unit dpt) and an axial angle (e.g. in the form of a transformed angle relative to a torsion reference axis of the first viewing direction). For the calculation and optimization of the spectacle lens, this transformed astigmatic refraction is taken into account in the target function, as described exemplarily above, as the refraction of the eye to be corrected in the viewing direction $-e_\zeta$ belonging to the evaluation point $i_b$.

In the optimization, the target function evaluates particularly local values of the refraction deficit of the first spectacle lens in a multitude of evaluation points of the spectacle lens, i.e. for a multitude of different viewing directions of the associated eye in the specific wearing situation. Thus, the spectacle lens is optimized particularly by minimizing the target function for the spectacle lens, wherein in the target function, for the at least one evaluation point $i_b$, a correction of the transformed astigmatic refraction by the spectacle lens in the specific wearing situation is taken into consideration. A minimization of the target function is preferably performed by varying at least one surface of the spectacle lens and by evaluating the optical properties of the spectacle lens in the specific wearing situation until the value of the target function has fallen below a predetermined threshold or until the value of the target function does not change any more or by less than a predetermined threshold between two consecutive evaluation or recursion steps. Such a threshold value can be defined as a discontinuation criterion for the calculation and optimization step.

Preferably, the method is performed such that the reference viewing direction $-e_z$ of the eye corresponds to the zero viewing direction of the spectacles wearer. Preferably, the spectacle lens is optimized such that for at least one reference point $i_0$ of the spectacle lens, in particular a distance reference point, a correction of the astigmatic (and preferably also of the spherical) refraction of the eye of the spectacles wearer is considered according to the reference values or prescription values $Z_0$, $\alpha_0$ and $S_0$ determined in a refraction determination. Accordingly, the minimization of the target function is preferably performed following this correction. Particularly preferably, the at least one evaluation point $i_b$ of the spectacle lens corresponds to a near reference point of the spectacle lens.

According to the invention, either the cylinder value or the cylinder axis is transformed for the astigmatic refraction in the correspondingly required way. Particularly preferably, both values are transformed. But already with a corresponding transformation of the astigmatic refraction with respect to one of the two values, an improvement of the optical properties and thus of the tolerability of the spectacles is obtained. If only one of the two values is transformed according to the invention, the other value can be adopted from the refraction determination in an unchanged way. Without wanting to neglect the preferred combination of both transformations, the transformations of the individual values provided by the invention will be described one after the other in the following.

Thus, in one aspect of the invention, in particular the cylinder value of the astigmatic refraction will be transformed. If determining the transformed astigmatic refraction comprises determining a transformed cylinder value $Z_i$, it is determined according to the invention such that according to $$Z_i = Z_0 + e\left(\text{Add} + \frac{1}{a_i}\right)\left(-2 + e\left(\text{Add} + \frac{1}{a_i} - 2S_0 - Z_0\right)\right)Z_0,$$

it depends on a distance e between the spectacle lens (in particular the vertex sphere of the spectacle lens) and the principal plane of the eye, and on a sphere $S_0$, determined for the reference viewing direction $-e_z$, of the refraction of the eye to be corrected, wherein Add designates a refractive power increase from the reference viewing direction $-e_z$ to a viewing direction $-e_\zeta$ of the eye corresponding to the at least one evaluation point $i_b$. Here, the sphere $S_0$ particularly corresponds to the value of the sphere determined in the refraction determination for the reference viewing direction $-e_z$ (preferably zero viewing direction).

Preferably, the corresponding transformation of the cylinder value is performed for each evaluation point of the spectacle lens. This transformed cylinder value is taken into account in the target function particularly as the value $Z_{Ref}$ (see above) to be corrected. According to the invention, is has been found that by this quickly calculatable transformation, which in particular does not require any additional measurements of the refraction for a multitude of further viewing directions, results in a clear improvement of the optical properties particularly in the near zone of a spectacle lens. In particular, it has been found that this transformation of the cylinder value leads to a very efficient consideration and compensation of the adjustment astigmatism. Moreover, this transformation can be implemented in an iterative optimization routine with very little computing effort.

Thus, according to the invention, a particularly efficient transformation of the cylinder value has been found, which for a specific wearing situation only depends on the prescription data sphere, cylinder, and axis in the reference viewing direction, for example distance sphere $S_F$, cylinder $Z_F$, and axis, and an amplitude of accommodation $\Delta A$ of the eye. This can be illustratively explained as follows.

For example, the near cylinder $Z_N$ can be calculated from the distance values with the following approximation formula in a very quick and simple manner:

$$Z_N = Z_F + Z_E \quad (1a)$$

$$Z_E = e\Delta A(2 + e(\Delta A + 2S'_F))Z_F \quad (1b)$$

where
e distance vertex sphere of the spectacle lens to the principal plane of the eye $$S'_F = S_F + \frac{Z_F}{2}$$

spherical equivalent of the distance prescription
$Z_F$ cylinder of the distance prescription
$\Delta A$ amplitude of accommodation of the eye The amplitude of accommodation $\Delta A$, in turn, can be calculated from the addition Add determined in the refraction determination and from the specified object distance (also referred to as object separation) $\alpha_1$ (in an evaluation point $i_b=1$).

$$\Delta A = -\left(\frac{1}{a_1} + \text{Add}\right)$$

Thus, it results for the near transformed cylinder value (transformed cylindrical power) that $$Z_N = Z_F + e\left(\text{Add} + \frac{1}{a_i}\right)\left(-2 + e\left(\text{Add} + \frac{1}{a_i} - 2S_F - Z_F\right)\right)Z_F, \quad (2)$$

which corresponds to the above-proposed transformation, wherein in particular the refraction values of the prescription (index "F" instead of the general designation with index "0") have been used here as reference values, while a near reference point of the spectacle lens (index "N") has preferably been used here for the general designation of the evaluation point $i_b$.

In the case of a determination of a transformed cylinder value $Z_i$ (in particular in the near reference point $Z_N$), the method preferably further comprises determining a transformed sphere $S_i$ (in particular $S_N$), which according to $$S_i = S_0 + \frac{(Z_0 - Z_i)}{2} + \text{Add} + e^2\left(\text{Add} + \frac{1}{a_i}\right)Z_0^2 \quad (3)$$

depends on the transformed cylinder value $Z_i$, and wherein the spectacle lens is optimized such that for the at least one evaluation point $i_b$, a correction of the transformed sphere $S_i$ by the spectacle lens in the specific wearing situation is taken into consideration.

In this way, it is possible to quickly and easily calculate the correction deficit of the spherical equivalent $S'_E$ and thus the near spherical equivalent $S'_N$ (i.e. in the near reference point) (or in a general designation type $S'_i$) and the near sphere $S_N$ (or generally $S_i$) with the following equation:

$$S'_N = S'_F + \text{Add} + S'_E \quad (4a)$$

$$S'_E = -e^2\Delta A Z_F^2 \quad (4b)$$

$$S_N = S'_N - \frac{Z_N}{2} \quad (4c)$$

The near sphere $S_N$ changes due to a change of the near cylinder $Z_N$ also if the change of the spherical equivalent $S'_N$ according to equations (4a) and (4b) is neglected.

In a preferred embodiment, the above-described method for at least partly compensating for the adjustment astigmatism and the adjustment error of the spherical equivalent can only be used for near vision, for example to calculate a single-vision lens for near vision or to calculate the adjustment astigmatism and the adjustment error of the spherical equivalent in the near reference point of a progressive lens. In this case, particularly an object distance specified by the specific wearing situation is preferably used for each viewing direction. In a further preferred embodiment, the respective object distance can be interpolated between the near and distance values. Alternatively, it is possible to calculate the transformed cylinder value and the transformed sphere directly for each visual point of the progressive lens with the above-mentioned equations by inserting into equations (2) and (3), the object distance specified by the specific wearing situation for each viewing direction, and inserting for Add, instead of the addition, the predetermined refractive power increase in the corresponding visual point.

In a further aspect of the invention, in particular the axial angle of the astigmatic refraction is transformed. If the determination of the transformed astigmatic refraction comprises a determination of a transformed cylinder axis $\alpha_i$, it is determined according to the invention such that it encloses a correction torsion angle $\psi_K$ with a torsion reference axis $e_L$ that is perpendicular both to the reference viewing direction $-e_z$ and to a viewing direction $-e_\zeta$ of the eye corresponding to an at least one evaluation point $i_b$, said correction torsion angle $\psi_K$ deviating from a reference torsion angle $\psi_0$ between the cylinder reference axis $\alpha_0$ and the torsion reference axis $e_L$ by a torsion correction angle $$\psi_\Delta = \frac{(\sin\vartheta)\Delta\varphi}{1 + \cos\vartheta\cos\left(\varphi + \frac{\Delta\varphi}{2}\right)},$$

which depends on the first Helmholtz angle $\theta$ and on the second Helmholtz angle $\phi$ for the viewing direction $-e_\zeta$ of the eye corresponding to the at least one evaluation point $i_b$ as well as on a convergence angle 66 $\phi$ according to $$\Delta\varphi = -\frac{PD - a_i(\Delta d_y S_{xy} + \Delta Pr_0)}{a_i - b'(1 + a_i S_{xx})}$$

in dependence on a pupillary distance PD of the spectacles wearer, a distance between center of rotation and lens vertex b', and components $S_{xx}$ and $S_{xy}$ of a refractive power matrix $$S = \begin{pmatrix} S_{xx} & S_{xy} \\ S_{xy} & S_{yy} \end{pmatrix}$$

of the spectacle lens, wherein the value $\Delta Pr_0$ designates a prismatic power and the value $\Delta d_y$ designates a difference of the vertical infraduction between left and right eyes.

Here, the Helmholtz angles are to be understood in the usual way such that by a combination of a first rotation of the eye about a horizontal first rotation axis $e_x$ (particularly through the ocular center of rotation) of the eye (first base axis of the eye), which is perpendicular to the reference viewing direction $-e_z$ of the eye, by the first Helmholtz angle $\theta$, and a second rotation of the eye about a second rotation axis $e_{y,H}$ of the eye by the second Helmholtz angle $\phi$, the reference viewing direction $-e_z$ of the eye transitions into the viewing direction $-e_\zeta$ of the eye corresponding to the at least one evaluation point $i_b$ of the spectacle lens, wherein the second rotation axis $e_{y,H}$ of the eye is an axis rotated about the first rotation axis $e_x$ by the first Helmholtz angle $\theta$ with respect to an axis $e_y$ perpendicular to the reference viewing direction $-e_z$ of the eye and to the first rotation axis $e_x$ (in particular through the ocular center of rotation; second base axis of the eye). The method preferably comprises determining the reference viewing direction $-e_\zeta$ of the eye corresponding to the at least one evaluation point $i_b$ of the spectacle lens, wherein determining the viewing direction $-e_\zeta$ preferably comprises determining the first and second Helmholtz angles.

In comparison with conventional methods, which particularly do not consider a correction of eye torsion upon eye movements or disregard the viewing direction of the other eye, the method according to the invention achieves a substantial improvement of the optical adaptation of the spectacle lens for the wearer. Different from the method described in WO 2010/054817 A1, it is not necessary in the method according to the invention to know the other spectacle lens or to perform a complete ray tracing for the other eye. Instead, the inventors have surprisingly found out that a very good correction of the astigmatic refraction for near vision can already be achieved by the transformation of the eye torsion according to the invention, without a complete ray tracing for the respectively other eye being required. Thus, a clear reduction of computing effort for the optimization of the spectacle lens and a correspondingly faster and more cost-effective optimization and production of the spectacle lens are achieved in contrast to the other method.

In one aspect, in particular a transformation of the axial angle of the astigmatism to be corrected is performed. Thus, not the same axial angle for all evaluation points, particularly the axial angle specified for a reference viewing direction in the prescription data of the spectacles wearer, is taken into account in the target function, but an axial angle corrected by the torsion correction angle (i.e. transformed cylinder axis) for at least one viewing direction deviating from the reference viewing direction is taken as a basis in the minimization of the target function.

Here, according to the invention, a specially efficient transformation of the axial angle has been found, which, for a specific wearing situation, only depends on the data for the spectacle lens to be corrected as well as on the pupillary distance PD and maybe or optionally on a prismatic power. This can be illustratively explained as follows, reference being made to WO 2010/054817 A1 with respect to the understanding of the Helmholtz coordinates for comparison purposes.

For oblique or diagonal viewing directions of the eye, a fixed, tilted coordinate system is described for example, in which the wavefront is illustrated and which is appropriately associated with the base coordinate system in the straight viewing direction, to which system the refraction data preferably refer.

Preferably, this coordinate transition is appropriately described by Helmholtz coordinates $(\phi,\theta,\psi)$. In other preferred embodiments, a different representation, such as Fick's coordinates or Euler angle, could be used as well. In the following, a preferred use of the Helmholtz coordinates will be exemplarily described, reference being made to FIG. 1 for illustrative purposes.

Thus, determining a viewing direction $-e_\zeta$ of the eye preferably comprises determining a first Helmholtz angle $\theta$ of the eye and a second Helmholtz angle $\phi$ of the eye. These angles are particularly determined such that the reference viewing direction $-e_z$ of the eye transitions into the corresponding viewing direction $-e_\zeta$ of the eye by a combination of a first rotation of the eye about a first rotation axis $e_x$ (first base axis of the eye) by the first Helmholtz angle $\theta$, and a second rotation of the eye about a second rotation axis $e_{y,H}$ by the second Helmholtz angle $\phi$.

Here, the first rotation axis $e_x$ is perpendicular to the reference viewing direction $-e_z$ of the eye and, in the specific wearing situation (in particular for the usual straight head posture of the spectacles wearer), goes horizontally through the ocular center of rotation of the eye. The second rotating axis $e_{y,H}$ of the eye is specified as an axis that results from a second base axis $e_y$ of the eye by a rotation about the first rotation axis $e_x$ of the eye by the first Helmholtz angle $\theta$ of the eye, i.e. that the second base axis $e_y$, which is rotated about the first rotation axis $e_x$ of the eye by the first Helmholtz angle $\theta$ of the eye, coincides with the second rotation axis $e_{y,H}$. The second base axis $e_y$ of the eye, in turn, is perpendicular both to the reference viewing direction $-e_z$ of the eye and to the first rotation axis $e_x$ of the eye.

Preferably, in addition to the stationary base coordinate system ($e_x, e_y, e_z$), an ocularly fixed coordinate system or a moving trihedron ($e_{x,H}, e_{y,H}, e_{z,H}$) is defined, which arises from the basis vectors of the base coordinate system when the Helmholtz matrix H is applied:

$$e_{x,H} = H(\theta, \phi, \psi) \cdot e_x$$

$$e_{y,H} = H(\theta, \phi, \psi) \cdot e_y$$

$$e_{z,H} = H(\theta, \phi, \psi) \cdot e_z$$

with $$H(\theta, \phi, \psi) := H_x(\theta) H_y(-\phi) H_z(\psi)$$

wherein $$H_x(\vartheta) := \begin{pmatrix} 1 & 0 & 0 \\ 0 & \cos\vartheta & -\sin\vartheta \\ 0 & \sin\vartheta & \cos\vartheta \end{pmatrix}$$

$$H_y(\varphi) := \begin{pmatrix} \cos\varphi & 0 & \sin\varphi \\ 0 & 1 & 0 \\ -\sin\varphi & 0 & \cos\varphi \end{pmatrix}$$

$$H_x(\vartheta) := \begin{pmatrix} \cos\psi & -\sin\psi & 0 \\ \sin\psi & \cos\psi & 0 \\ 0 & 0 & 1 \end{pmatrix}$$

The angles $\phi$ and $\theta$ specify the viewing direction, while the angle $\psi$ describes the torsion adjustment of the eye. The vector $HS = e_\zeta$ indicates the vector of the eye-side main ray for the eye in the definition of the moving trihedron. Since it is fixedly coupled to the viewing direction, the two viewing angles $\phi$ and $\theta$ can be reconstructed from the vector HS according to $$\varphi = -\arcsin HS_x, \quad -\frac{\pi}{2} < \varphi < \frac{\pi}{2}$$

$$\vartheta = -\arctan\frac{HS_y}{HS_z}, \quad -\frac{\pi}{2} < \vartheta < \frac{\pi}{2}$$

The third angle $\psi$, however, cannot be derived from the viewing direction, but instead arises from an appropriate torsion adjustment of the eye. For this, different physiological models are available. For example, a model demanding that the final position of the eye be specified in that the eye is brought to the final position by a rotation about the torsion reference axis $e_L$ from the zero viewing direction, wherein the torsion reference axis $e_L$ is characterized in that it entirely lies in the plane that is perpendicular to the zero viewing direction, is referred to as Listing's model or Listing's rule "L1" or Listing's rule for distance vision, since it only provides a good approximation for distance vision. In particular, the torsion reference axis $e_L$ in Helmholtz coordinates is given by $$e_L = \frac{1}{1 + \tan\frac{\varphi}{2}\tan\frac{\vartheta}{2}\tan\frac{\psi}{2}} \begin{pmatrix} \tan\frac{\vartheta}{2} - \tan\frac{\psi}{2}\tan\frac{\varphi}{2} \\ -\tan\frac{\varphi}{2} - \tan\frac{\vartheta}{2}\tan\frac{\psi}{2} \\ \tan\frac{\psi}{2} - \tan\frac{\varphi}{2}\tan\frac{\vartheta}{2} \end{pmatrix}$$

wherein the last component of the axis $e_L$ disappears. i.e.

$$\tan\frac{\psi}{2} - \tan\frac{\varphi}{2}\tan\frac{\vartheta}{2} = 0 \Leftrightarrow \psi_{Helmholtz}(\varphi, \vartheta) = 2\arctan\left(\tan\frac{\varphi}{2}\tan\frac{\vartheta}{2}\right)$$

i.e. the torsion angle $\psi$ can be seen as a function of the viewing angles according to Listing's rule L1.

For example, WO 2010/054817 A1 discloses how the data of the two eye-side main rays are used to determine the torsion angles of both eyes based on Listing's Rule for near vision (also referred to as Listing's Rule L2). However, this method assumes that a pair or corresponding main rays is known for each visual point. The calculation of such main ray pairs requires great computing effort compared to the present invention and in addition requires the simultaneous knowledge of both lenses. According to the invention, an approximative procedure is proposed, which can do with the data of a single lens and thus particularly can do without the calculation of a main ray pair.

The convergence angle $\Delta\phi$ is taken into account in the torsion description due to Listing's rule for near vision as follows. WO 2010/054817 A1 first of all discloses that the eye positions can be described in Helmholtz coordinates by the two torsion angles $$\psi_{corrected}^{(l)} = \psi_{corrected}^{(r)} = \frac{\psi_{Helmholtz}(\varphi^{(l)}, \vartheta^{(l)}) + \psi_{Helmholtz}(\varphi^{(r)}, \vartheta^{(r)})}{2} \quad (5)$$

wherein the function is determine by $$\psi_{Helmholtz}(\varphi, \vartheta) = 2\arctan\left(\tan\frac{\varphi}{2}\tan\frac{\vartheta}{2}\right) \quad (6)$$

Equation (5) can be reformulated according to $$\psi_{korrigiert}^{(l)} = \psi_{Helmholtz}(\phi^{(l)}, \theta^{(l)}) - \Delta\psi_{Helmholtz}(\phi^{(r)}, \theta^{(r)}, \phi^{(l)}, \theta^{(l)})$$

$$\psi_{korrigiert}^{(r)} = \psi_{Helmholtz}(\phi^{(r)}, \theta^{(r)}) - \Delta\psi_{Helmholtz}(\phi^{(r)}, \theta^{(r)}, \phi^{(l)}, \theta^{(l)}) \quad (7)$$

with the torsion correction angle $$\Delta\psi_{Helmholtz}(\varphi^{(r)}, \vartheta^{(r)}, \varphi^{(l)}, \vartheta^{(l)}) := \quad (7a)$$

$$\frac{\psi_{Helmholtz}(\varphi^{(l)}, \vartheta^{(l)}) - \psi_{Helmholtz}(\varphi^{(r)}, \vartheta^{(r)})}{2}$$

Now, if a cyclopean eye is added by the mean values $$\varphi^{(Z)} = \frac{\varphi^{(l)} + \varphi^{(r)}}{2} \Leftrightarrow \begin{array}{l} \varphi^{(l)} = \varphi^{(Z)} + \frac{\Delta\varphi}{2} \\ \varphi^{(r)} = \varphi^{(Z)} - \frac{\Delta\varphi}{2} \end{array} \quad (8a)$$

$$\Delta\varphi = \varphi^{(l)} - \varphi^{(r)}$$

and $$\varphi^{(Z)} = \frac{\vartheta^{(l)} + \vartheta^{(r)}}{2} \Leftrightarrow \begin{array}{l} \vartheta^{(l)} = \vartheta^{(Z)} + \frac{\Delta\vartheta}{2} \\ \vartheta^{(r)} = \vartheta^{(Z)} - \frac{\Delta\vartheta}{2} \end{array} \quad (8b)$$

$$\Delta\vartheta = \vartheta^{(l)} - \vartheta^{(r)}$$

and if the angles $\phi^{(r)}$, $\theta^{(r)}$, $\phi^{(l)}$, $\theta^{(l)}$ are substituted into equations (7, 7a), then the torsion angles $\psi_{korrigiert}^{(l)}$, $\psi_{korrigiert}^{(r)}$ corrected for near vision according to Listing will be obtained as a function of the viewing direction angles $\phi^{(Z)}$, $\theta^{(Z)}$ of the cyclopean eye, convergence angle $\Delta\phi$, and the angle $\Delta\theta$. If particularly the angles $\Delta\phi$, $\Delta\theta$ are sufficiently small, then equation (7a) for the torsion correction angle can be expanded in series according to $$\Delta\psi_{Helmholtz}(\varphi^{(r)}, \vartheta^{(r)}, \varphi^{(l)}, \vartheta^{(l)}) := \frac{(\sin\vartheta^{(Z)})\Delta\varphi + (\sin\varphi^{(Z)})\Delta\vartheta}{1 + \cos\vartheta^{(Z)}\cos\varphi^{(Z)}} + O(\Delta^3), \quad (9)$$

wherein the expression $O(\Delta^3)$ comprises all terms $\Delta\phi^p\Delta\theta^q$ for which p+q=3, i.e. $\Delta\phi^3$, $\Delta\phi^2\Delta\theta$, $\Delta\phi\Delta\theta^2$, $\Delta\theta^3$.

Particularly, if a situation with $\Delta\theta=0$ is present, then $\theta^{(Z)}=\theta^{(l)}=\theta^{(r)}$, and the torsion correction angle can be described according to equation (9) only by the convergence angle:

$$\Delta\psi_{Helmholtz}(\varphi^{(r)}, \vartheta^{(r)}, \varphi^{(l)}, \vartheta^{(l)}) := \frac{(\sin\vartheta^{(Z)})}{1 + \cos\vartheta^{(Z)}\cos\varphi^{(Z)}} + O(\Delta\varphi^3) \quad (9a)$$

If one identifies the designations $\phi^{(r)}$, $\theta^{(r)}$, $\phi^{(l)}$, $\theta^{(l)}$ of WO 2010/054817 A1 with the corresponding designations $\phi_l$, $\theta_r$, $\phi^{(l)}$, $\theta^{(L)}$ of the present description, and if one replaces the viewing angles of the cyclopean eye again by those of the present eye, $$\vartheta^{(Z)} = \vartheta_l \text{ and } \varphi^{(Z)} = \varphi_l - \frac{\Delta\varphi}{2}$$

for the left eye and $$\vartheta^{(Z)} = \vartheta_r \text{ and } \varphi^{(Z)} = \varphi_r + \frac{\Delta\varphi}{2}$$

for the right eye, then one obtains for the left eye $$\Delta\psi_{Helmholtz}(\varphi_l, \vartheta_l) := \frac{(\sin\vartheta_l)\Delta\varphi}{1 + \cos\vartheta_l\cos(\varphi_l - \Delta\varphi/2)} + O(\Delta\varphi^3) \quad (9b)$$

expressed only by parameters determined by the viewing angles of the left man ray and the convergence angle, and for the right eye $$\Delta\psi_{Helmholtz}(\varphi_r, \vartheta_r) := \frac{(\sin\vartheta_r)\Delta\varphi}{1 + \cos\vartheta_r\cos(\varphi_r + \Delta\varphi/2)} + O(\Delta\varphi^3) \quad (9c)$$

expressed only by parameters determined by the viewing angles of the right main ray and the convergence angle.

Thus, one only has to determine the convergence angle and can therefrom calculate the additional torsional movement of the eye with respect to the model "Listing 1" with the above equations (9b) and (9c) and thus the required axial angle in a simple manner.

To this end, advantage is taken of the fact that the convergence angle $\Delta\phi$ can be estimated when the object distance $-a_1>0$ (in an evaluation point $i_b=1$), the pupillary distance PD, and the dioptric and prismatic powers of the lenses (which are assumed to be identical) are known and the local prismatic power is estimated by means of Prentice's rule.

A corresponding approach is characterized in that on the pupillary distance PD, the object distance $a_1$, and the spherical power S are required to calculate the convergence angle.

Figure 3:
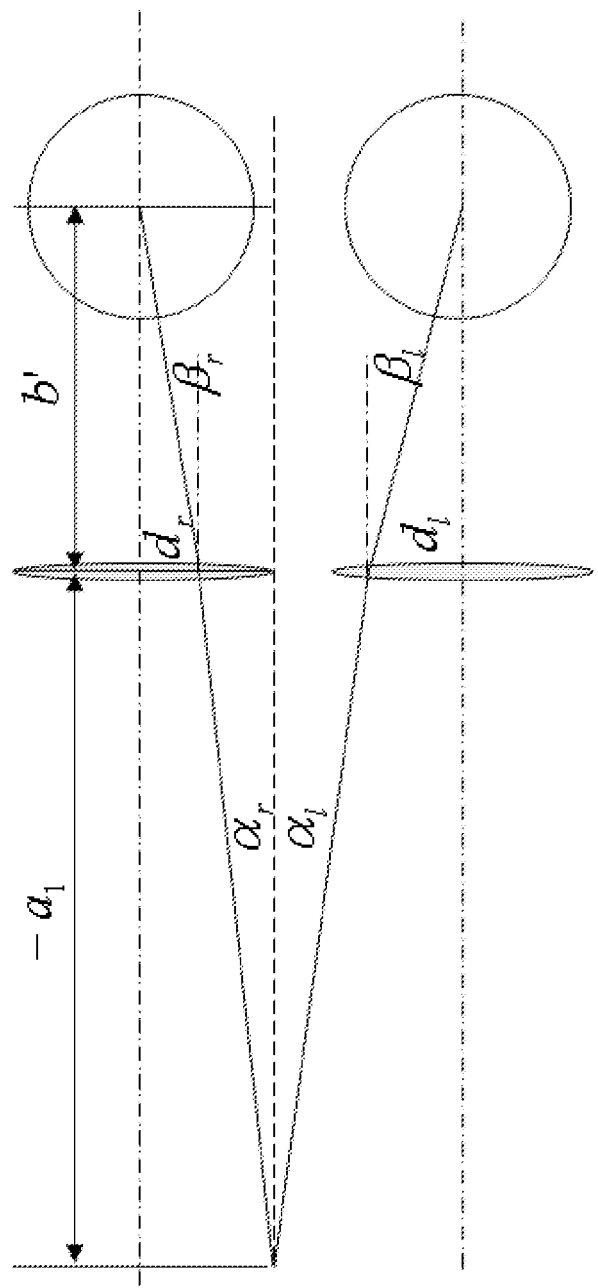

For a purely spherical lens, with the parameters shown in FIG. 3, Prentice's rule yields separately for left and right in a paraxial approximation:

$$Pr_r := \phi_r - \alpha_r = S \cdot d_r$$

$$Pr_l := \phi_l - \alpha_l = S \cdot d_l \quad (10)$$

Here, S is optionally the spherical prescription power, the vertex power $S'_\infty$, or another parameter describing the dioptric power of the lens. A subtraction yields:

$$(\phi_l - \phi_r) - (\alpha_l - \alpha_r) = S \cdot (d_l - d_r) \quad (11)$$

If $$\alpha_r \approx \frac{-PD/2 - d_r}{-a_1} \text{ and } \alpha_l \approx \frac{PD/2 - d_l}{-a_1}$$

as well as $d_r \approx b'\phi_r$ and $d_l \approx b'\phi_l$ are replaced paraxially, the solution can be with respect to $\Delta\phi = \phi_l - \phi_r$ and one will obtain:

$$\Delta\varphi = \frac{PD}{b' - a_1(1 - b'S)} \quad (12)$$

$$= -\frac{PD}{a_1 - b'(1 + a_1 S)}$$

Thus, it is possible to calculate the convergence angle very quickly with few parameters (pupillary distance PD, spherical power S, and object distance $a_1$).

In a further approach, the prescribed prismatic power $Pr_v$ is additionally taken into consideration for the calculation of the convergence angle. The horizontal component of the prescribed prism $Pr_0$ is determined for left and right by $$Pr_{0,r} = Pr_v \cos\beta_r$$

$$Pr_{0,l} = Pr_v \cos\beta_l \quad (13)$$

where β represents the base setting for right and left each. According to FIG. 3, Prentice's rule yields separately for left and right in a paraxial approximation:

$$Pr_r := \phi_r - \alpha_r = S \cdot d_r + Pr_{0,r}$$

$$Pr_l := \phi_l - \alpha_l = S \cdot d_l + Pr_{0,l} \quad (14)$$

A subtraction yields:

$$(\phi_l - \phi_r) - (\alpha_l - \alpha_r) = S \cdot (d_l - d_r) + \Delta Pr_0 \quad (15)$$

with $\Delta Pr_0 := Pr_{0,l} - Pr_{0,r}$. By analogy with equation (12), one obtains $$\Delta\varphi = \frac{PD - a_1 \Delta Pr_0}{b' - a_1(1 - b'S)} \quad (16)$$

$$= -\frac{PD - a_1 \Delta Pr_0}{a_1 - b'(1 + a_1 S)}.$$

Thus, it is possible to calculate the convergence angle very quickly with few parameters (pupillary distance PD, prismatic power Pr, object distance $a_1$, and spherical power S). The method becomes more precise by taking the prismatic power into consideration, especially in the case of a prescribed prism.

In a further approach, the cylindrical power is considered in addition to the spherical power for the calculation of the convergence angle. In the general spherocylindrical case, it changes compared to the approach of equation (10) according to $$Pr_r := \varphi_r - \alpha_r = (S_{xx} \ S_{xy}) \begin{pmatrix} d_{r,x} \\ d_{r,y} \end{pmatrix} \quad (17)$$

$$Pr_l := \varphi_l - \alpha_l = (S_{xx} \ S_{xy}) \begin{pmatrix} d_{l,x} \\ d_{l,y} \end{pmatrix}$$

Here, the matrix $$S = \begin{pmatrix} S_{xx} & S_{xy} \\ S_{xy} & S_{yy} \end{pmatrix}$$

represents optionally the matrix form of the spherical prescription power, the vertex power matrix $S'_\infty$, or another matrix describing the spherocylindrical power of the lens.

The result then reads $$\Delta\varphi = -\frac{PD - a_1(d_{l,y} - d_{r,y})S_{xy}}{a_1 - b'(1 + a_1 S_{xx})} \quad (18)$$

Assuming the same infractions for left and right, one obtains $$\Delta\varphi = -\frac{PD}{a_1 - b'(1 + a_1 S_{xx})} \quad (19)$$

since $\Delta d_y = (d_{l,y} - d_{r,y}) = 0$.

Thus, it is possible to calculate the convergence angle very quickly with few parameters (pupillary distance PD, spherocylindrical power S, and object distance $a_1$).

In a further approach, the cylindrical and prismatic powers are considered in addition to the spherical power for the calculation of the convergence angle. In the general spherocylindrical case with prescription prism, equation (17) is added a term with the prescribed horizontal prism, i.e. with $$Pr_{0,r} = Pr_v \cos \alpha_r$$

$$Pr_{0,l} = Pr_v \cos \alpha_l \quad (20)$$

Then, it holds that:

$$Pr_r := \varphi_r - \alpha_r = (S_{xx} \ S_{xy}) \begin{pmatrix} d_{r,x} \\ d_{r,y} \end{pmatrix} + Pr_{0,r} \quad (21)$$

$$Pr_l := \varphi_l - \alpha_l = (S_{xx} \ S_{xy}) \begin{pmatrix} d_{l,x} \\ d_{l,y} \end{pmatrix} + Pr_{0,l}$$

The result reads:

$$\Delta\varphi = -\frac{PD - a_1((d_{l,y} - d_{r,y})S_{xy} + \Delta Pr_{0x})}{a_1 - b'(1 + a_1 S_{xx})} \quad (22)$$

Thus, it is possible to calculate the convergence angle very quickly and precisely.

In a further approach, different from equation (18), no explicit assumption on the difference $\Delta d_y = (d_{l,y} - d_{r,y})$ is made, but this difference is preferably eliminated as follows. In doing so, one obtains a common result for the two angles $\Delta\phi$ and $\Delta\theta$:

$$\Delta\varphi = \frac{-a_y PD}{a_x a_y - a_1^2 b'^2 S_{xy}^2} \quad (18a)$$

$$\Delta\vartheta = \frac{-a_1 b' S_{xy} PD}{a_x a_y - a_1^2 b'^2 S_{xy}^2}$$

The following abbreviations are introduced here:

$$a_x = a_1 - b'(1 + a_1 S_{xx})$$

$$a_y = a_1 - b'(1 + a_1 S_{yy})$$

In a further approach, different from equation (22), no explicit assumption on the difference $\Delta d_y = (d_{l,y} - d_{r,y})$ is made, but this difference is preferably eliminated as follows. In doing so, one obtains a common result for the two angles $\Delta\phi$ and $\Delta\theta$:

$$\Delta\varphi = \frac{a_y(a_1 \Delta Pr_0 - PD) + a_1^2 b' S_{xy} \Delta Pr_{90}}{a_x a_y - a_1^2 b'^2 S_{xy}^2} \quad (18b)$$

$$\Delta\vartheta = \frac{a_1 b' S_{xy}(a_1 \Delta Pr_0 - PD) - a_1 a_x \Delta Pr_{90}}{a_x a_y - a_1^2 b'^2 S_{xy}^2}$$

Here, use is made of the above-mentioned abbreviations for $a_x$ and $a_y$. By analogy with the above-introduced difference $\Delta Pr_0$ of the horizontal components of the prescribed prism left and right, $\Delta Pr_{90}$ represents the difference of the vertical components of the prescribed prism.

In the case of an arbitrary asymmetric lens, in particular a progressive lens, the variable S or S varies across the spectacle lens, and Prentice's rule would have to be used in the form of an integral, strictly speaking. According to the invention, however, it has been found that equations 812, 16, 18, 19, and 22) are already well suitable for calculating the convergence angle. For S or S, preferably a mean value between the local value at the visual point and the value at the prism reference point is used. As a further possibility, instead of these mean values, the values of S or S can directly be selected at the visual point (penetration point of the main ray) itself or at the prism reference point. Alternatively, the prescription values can be used as well.

Thus, the method according to the invention makes is possible that apart from the usual monocular refraction determination, the optician, optometrist, or ophthalmologist does not have to conduct any additional measurements, no further data has to be sent to the spectacle lens manufacturer, and the spectacle lens manufacturer can calculate a spectacle lens with improved properties for near vision without additional ray tracing by means of the above-listed equations.

Preferably, in the case of determining a transformed cylinder axis $\alpha_t$, it is determined such that the value $\Delta Pr_0$ of the prismatic power corresponds to the difference of the horizontal components of the prismatic prescription for the left and right eyes.

It is not absolutely necessary to take the actual prismatic power explicitly into consideration to achieve an improvement of the astigmatic correction. If no prismatic power is present or is to be considered, then preferably $\Delta Pr_0=0$ and/or $\Delta Pr_{90}=0$. Accordingly, in a further preferred embodiment, in the case of determining a transformed cylinder axis $\alpha_t$, it is determined such that the torsion correction angle $\psi_\Delta$ depends on the convergence angle $\Delta\phi$ according to $$\Delta\varphi = \frac{PD}{a_1 - b'(1+a_1 S)}$$

in dependence on the pupillary distance PD of the spectacles wearer, the distance between center of rotation and lens vertex b', and a spherical power S of the spectacle lens.

In a preferred embodiment, in the case of determining a transformed cylinder axis $\alpha_t$, it is determined such that as the spherical power S of the spectacle lens, on which a convergence angle $\Delta\phi$ according to $$\Delta\varphi = \frac{PD - a_1 \Delta Pr_0}{a_1 - b'(1+a_1 S)}$$

depends, the spherical power $S_0$ of the prescription for the spectacles wearer is used. It is directly available and does not require any additional, particularly iterative calculation step, which is why the method results in a particularly fast optimization.

In a further preferred embodiment, in the case of determining a transformed cylinder axis $\alpha_t$, it is determined such that as the spherical power S of the spectacle lens, on which a convergence angle $\Delta\phi$ according to $$\Delta\varphi = \frac{PD - a_1 \Delta Pr_0}{a_1 - b'(1+a_1 S)}$$

depends, the spherical power $S_i$ at the evaluation point $i_b$ is used. This results in a particularly good adaptation to the local properties of the spectacle lens, which leads to an optical property improved with respect to a constant value of the spherical power.

In a further preferred embodiment, in the case of determining a transformed cylinder axis $\alpha_t$, it is determined such that as the spherical power S of the spectacle lens, on which a convergence angle $\Delta\phi$ according to $$\Delta\varphi = \frac{PD - a_1 \Delta Pr_0}{a_1 - b'(1+a_1 S)}$$

depends, a mean value between the spherical power $S_i$ at the evaluation point $i_b$ and the spherical power at a reference point of the spectacle lens, in particular the prism reference point or the distance reference point, is used. This also requires a separate calculation of the spherical power to be considered in the determination of the convergence angle for each evaluation point, but it offers a very good approximation to the integration which is required for an exact calculation but is much more complex, as explained above.

In particular, the invention provides a computer program product including program parts, which, when loaded and executed on a computer, are adapted to perform a method for optimizing a spectacle lens for a specific wearing situation for correcting at least one astigmatic refraction of an eye of a spectacles wearer, which in a reference viewing direction $-e_z$ of the eye has a cylinder reference value $Z_0$ and a cylinder reference axis $\alpha_0$, comprising a calculation and optimization step of the spectacle lens, which comprises:
  specifying an object distance $a_i$ for at least one evaluation point $i_b$ of the spectacle lens;
  determining a transformed astigmatic refraction for the at least one evaluation point $i_b$ of the spectacle lens from the cylinder reference value $Z_0$ and the cylinder reference axis $\alpha_0$ depending on the specified object distance $a_i$; and
  optimizing the spectacle lens such that for the at least one evaluation point $i_b$ a correction of the transformed astigmatic refraction by the spectacle lens in the specific wearing situation is taken into consideration,
  wherein determining the transformed astigmatic refraction comprises determining a transformed cylinder value $Z_i$ in the above-described manner according to the invention and/or determining a transformed cylinder axis $\alpha_t$ in the above-described manner according to the invention depending on the specified object distance $a_i$.

Preferably, the computer program product comprises program parts, which, when loaded and executed on a computer, are adapted to perform a method according to the present invention or a preferred embodiment thereof.

Furthermore, the invention provides a storage medium with a computer program stored thereon, said computer program being adapted, when loaded and executed on a computer, to perform a method for optimizing a spectacle lens for a specific wearing situation for correcting at least one astigmatic refraction of an eye of a spectacles wearer, which in a reference viewing direction $-e_z$ of the eye has a cylinder reference value $Z_0$ and a cylinder reference axis $\alpha_0$, comprising a calculation and optimization step of the spectacle lens, which comprises:
  specifying an object distance $a_i$ for at least one evaluation point $i_b$ of the spectacle lens;
  determining a transformed astigmatic refraction for the at least one evaluation point $i_b$ of the spectacle lens from the cylinder reference value $Z_0$ and the cylinder reference axis $\alpha_0$ depending on the specified object distance $a_i$; and
  optimizing the spectacle lens such that for the at least one evaluation point $i_b$ a correction of the transformed astigmatic refraction by the spectacle lens in the specific wearing situation is taken into consideration,
  wherein determining the transformed astigmatic refraction comprises determining a transformed cylinder value $Z_i$ in the above-described manner according to the invention and/or determining a transformed cylinder axis $\alpha_i$ in the above-described manner according to the invention depending on the specified object distance $a_i$.

Preferably, the storage medium comprises program codes, which, when loaded and executed on a computer, are adapted to perform a method according to the present invention or a preferred embodiment thereof.

Finally, the invention provides a device for producing at least one spectacle lens, wherein the device comprises obtaining means or an obtaining unit for obtaining target data of at least one spectacle lens and calculation and optimization means for calculating and optimizing at least one spectacle lens for a specific wearing situation for correcting at least one astigmatic refraction of an eye of a spectacles wearer. In particular, the obtaining unit or the obtaining means is/are adapted to obtain prescription data, such as an astigmatic refraction of an eye of a spectacles wearer, which in a reference viewing direction $-e_z$ of the eye has a cylinder reference value $Z_0$ and a cylinder reference axis $\alpha_0$. Preferably, the obtaining means are further adapted to at least partially detect or specify the specific wearing situation.

The calculation and optimization means are adapted to calculate and optimize at least one spectacle lens for the specific wearing situation for correcting at least the astigmatic refraction of the eye of the spectacles wearer, wherein the calculation and optimization are performed such as to comprise a calculation and optimization step of the spectacle lens, which comprises:

specifying an object distance $a_i$ for at least one evaluation point $i_b$ of the spectacle lens;
determining a transformed astigmatic refraction for the at least one evaluation point $i_b$ of the spectacle lens from the cylinder reference value $Z_0$ and the cylinder reference axis $\alpha_0$ depending on the specified object distance $a_i$; and
optimizing the spectacle lens such that for the at least one evaluation point $i_b$ a correction of the transformed astigmatic refraction by the spectacle lens in the specific wearing situation is taken into consideration,
wherein determining the transformed astigmatic refraction comprises determining a transformed cylinder value $Z_i$ in the above-described manner according to the invention and/or determining a transformed cylinder axis $\alpha_i$ in the above-described manner according to the invention depending on the specified object distance $a_i$.

Preferably, the device is adapted to perform a method according to the present invention or a preferred embodiment thereof.

For a predetermined wearing position of the spectacle lens for a spectacles wearer, i.e. for a predetermined position of the spectacle lens in front of the corresponding eye of the spectacles wearer, and a predetermined object distance, a corresponding pair of viewing directions of the right and left eyes results for many object points, which change during eye movements depending on the object position. Thus, not only every single viewing direction, but in particular also the relation of the two viewing directions to each other depends on the wearing situation and the spectacle lens. Due to the consideration of the influence of the wearing situation on the torsion of the eye via the proposed transformation, in which a simulated convergence angle is taken into account already without explicit knowledge and tracing of the ray path for the other eye, an improved correction of astigmatic refractions across a broad range of use of a spectacle lens, in particular also in the near zone, can be achieved.

The wearing situation specifies a positioning of the spectacle lens in front of the eye of the spectacles wearer and an object distance model. Thus, as the wearing situation, in particular data of wear relating to a positioning of the spectacle lens for a spectacles wearer and relating to a visual task of the spectacles wearer are obtained and provided. Such data of wear preferably comprise frame data, in particular with respect to a box dimension or boxing system of the frame lenses or frame spectacle lens shapes and/or the bridge width and/or a face form angle and/or a forward inclination etc. of the spectacles. In a preferred embodiment, the data of wear relating to a visual task comprise a specification on mainly used viewing angle ranges and/or mainly used object distances.

In any case, the specific wearing situation, for a multitude of viewing directions of the eye of the spectacles wearer, uniquely specifies the position of an associated object point such that the visual ray of the eye upon looking at the object point (depending on the optical power of the spectacle lens) is uniquely specified as well. The penetration points of the visual rays through the spectacle lens are referred to as visual points. Here, each visual point can represent an evaluation point for the spectacle lens on the front and/or the back surface of a spectacle lens. Due to the clear assignment of the visual rays and object points to the visual points through the spectacle lens, the respective evaluation point might also be represented by the corresponding visual ray or the viewing direction and/or the object point. In a preferred embodiment, the evaluation points of a spectacle lens are represented by two coordinates of a coordinate system specified with respect to the spectacle lens. To this end, preferably a Cartesian x-y-z coordinate system is specified, the origin of which e.g. being in the geometric center (of the uncut or raw-round first or second spectacle lens) or in the lens center of the first or the second spectacle lens in particular on the front surface thereof, wherein the y axis extends in the vertical direction in the wearing position or wearing situation, and the z axis faces toward the eye. Thus, the evaluation points can in particular be represented by the x-y coordinates of the visual points.

Depending on the desired application or objective, the spectacle lens can be produced and optimized for a predetermined or predeterminable wearing situation of an average or individually determined spectacles wearer.

An average wearing situation (as defined in DIN 58 208 part 2) can be characterized by:
parameters of a standard eye, such as the so-called Gullstrand's schematic eye of a spectacles wearer (ocular center of rotation, entrance pupil, and/or principal plane, etc.);
parameters of a standard wearing position or arrangement of the spectacle lens pair in front of the eyes of the spectacles wearer (face form angle, forward inclination, corneal vertex distance, etc.); and/or
parameters of a standard object model or standard object distance.

For example, the wearing position can be specified on the basis of a standardized wearing position. If the spectacle frame or the spectacles according to a standardized wearing position is used, the ocular center of rotation distance is approx. 27.4 mm or approx. 27.9 mm or approx. 28.5 mm or approx. 28.8 mm, the forward inclination, i.e. the pantoscopic angle, is approx. 8°, the face form angle is approx. 0°, the pupillary distance is approx. 63 mm, the corneal vertex distance is approx. 15 mm, the object distance in the distance reference point is approx. 0 dpt, and the object distance in the near reference point is approx. −2.5 dpt.

In particular, if the spectacle frame or the spectacles according to a standardized wearing position is used, the ocular center of rotation distance is approx. 26.5 mm, the forward inclination, i.e. the pantoscopic angle, is approx. 9°, the face form angle is approx. 5°, the pupillary distance is approx. 64 mm, and the corneal vertex distance is approx. 13 mm.

Alternatively, if the spectacle frame or the spectacles according to a standardized wearing position is used, the ocular center of rotation distance is approx. 28.5 mm, the forward inclination, i.e. the pantoscopic angle, is approx. 7°, the face form angle is approx. 0°, the pupillary distance is approx. 63 mm, and the corneal vertex distance is approx. 15 mm.

Alternatively, if the spectacle frame or the spectacles according to a standardized wearing position is used, the ocular center of rotation distance is approx. 25 mm, the forward inclination, i.e. the pantoscopic angle, is approx. 8°, the face form angle is approx. 5°, the pupillary distance is approx. 64 mm, and the corneal vertex distance is approx. 13 mm.

Alternatively, if the spectacle frame or the spectacles according to a standardized wearing position is used, the ocular center of rotation distance is approx. 27.5 mm, the forward inclination, i.e. the pantoscopic angle, is approx. 11°, the face form angle is approx. 0°, the pupillary distance is approx. 65 mm, and the corneal vertex distance is approx. 14 mm.

The following numerical parameters characterize an average wearing situation, for example:
- corneal vertex distance (CVD)=15.00 mm;
- pantoscopic angle=8.0 degrees;
- face form angle=0.0 degrees;
- pupillary distance=63.0 mm;
- ocular center of rotation distance e=28.5 mm;
- object distance model: infinite object distance in the upper portion of the spectacle lens, which smoothly transitions to an object distance of 2.6 dpt with x=0 mm, y=−20 mm.

Alternatively, individual parameters of the eye or the eyes of a specific spectacles wearer (ocular center of rotation, entrance pupil, and/or principal plane, etc.), the individual wearing position or arrangement in front of the eyes of the spectacles wearer (face form angle, pantoscopic angle, corneal vertex distance, etc.), and/or the individual object distance model can be taken into consideration.

Figure 2A:
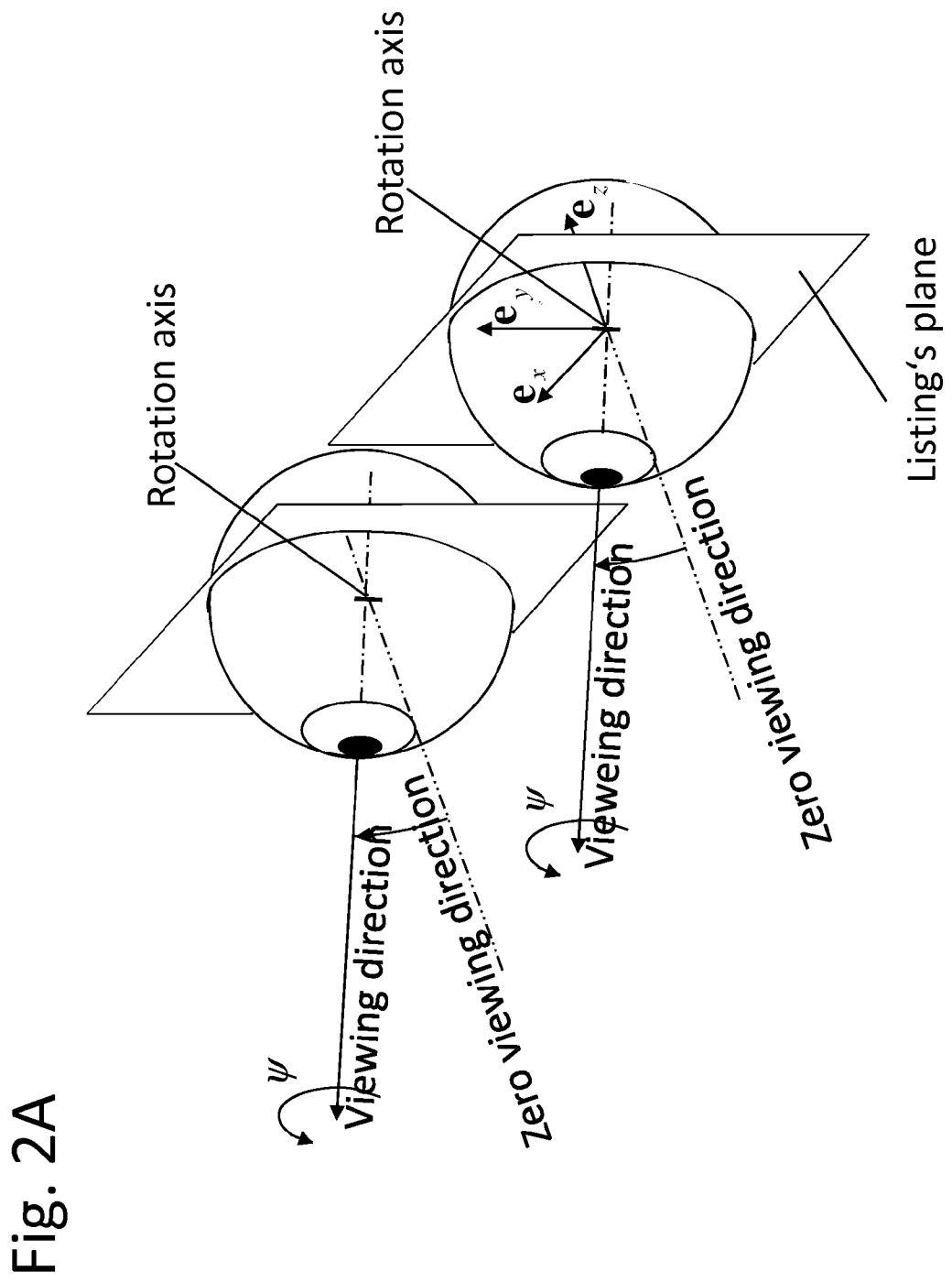
Figure 2B:
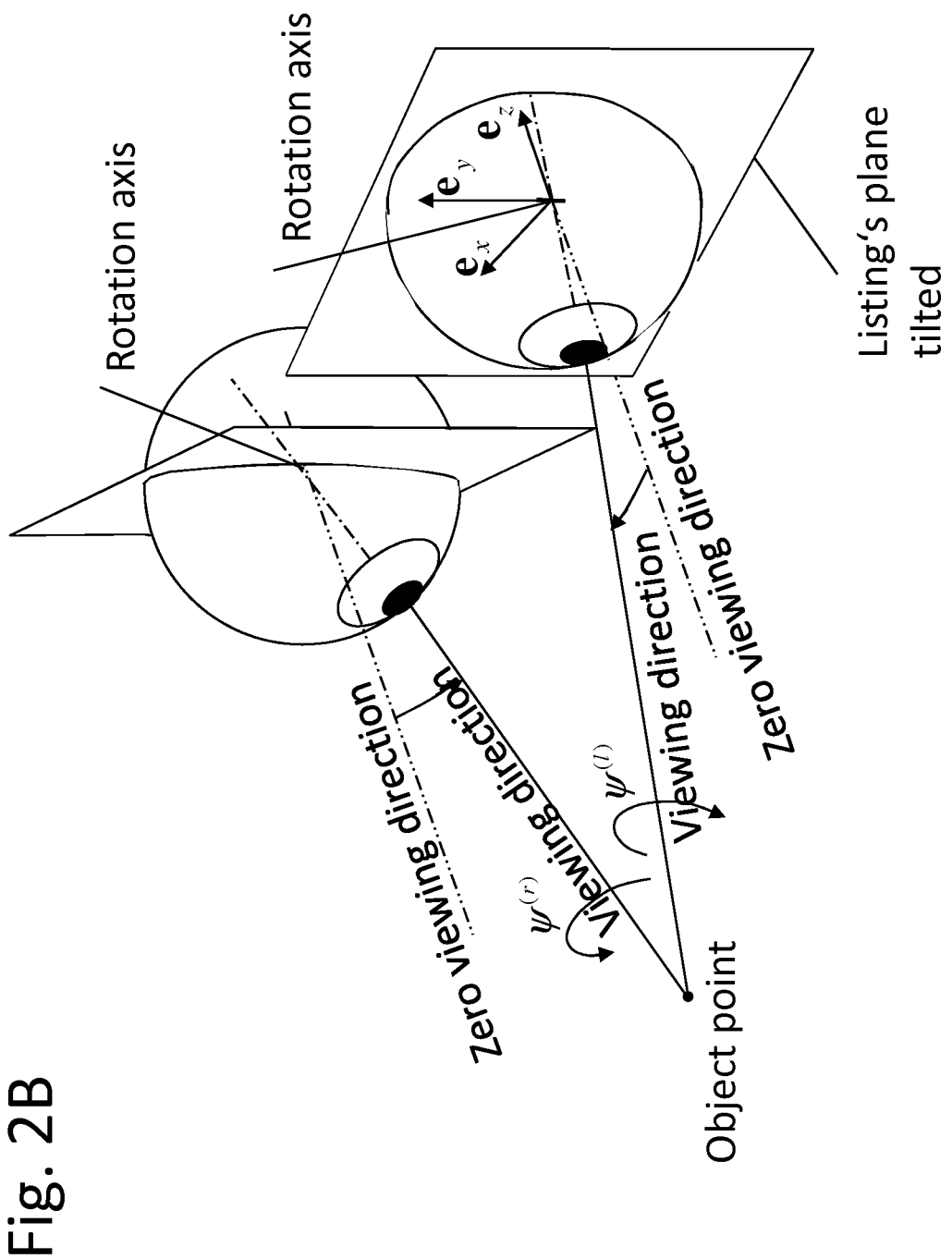
Figure 4B:
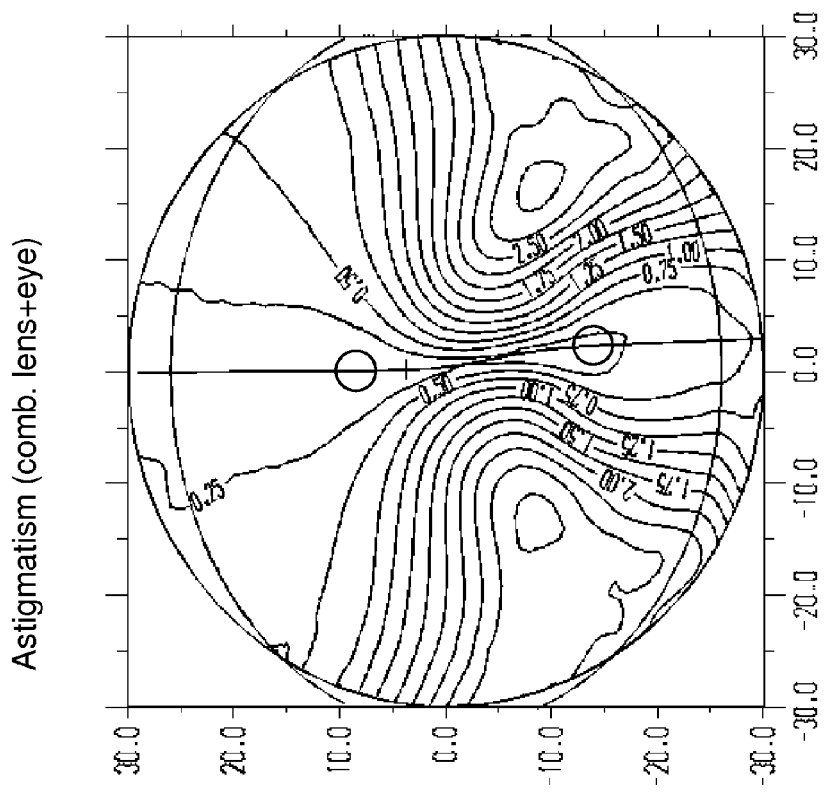
Figure 4A:
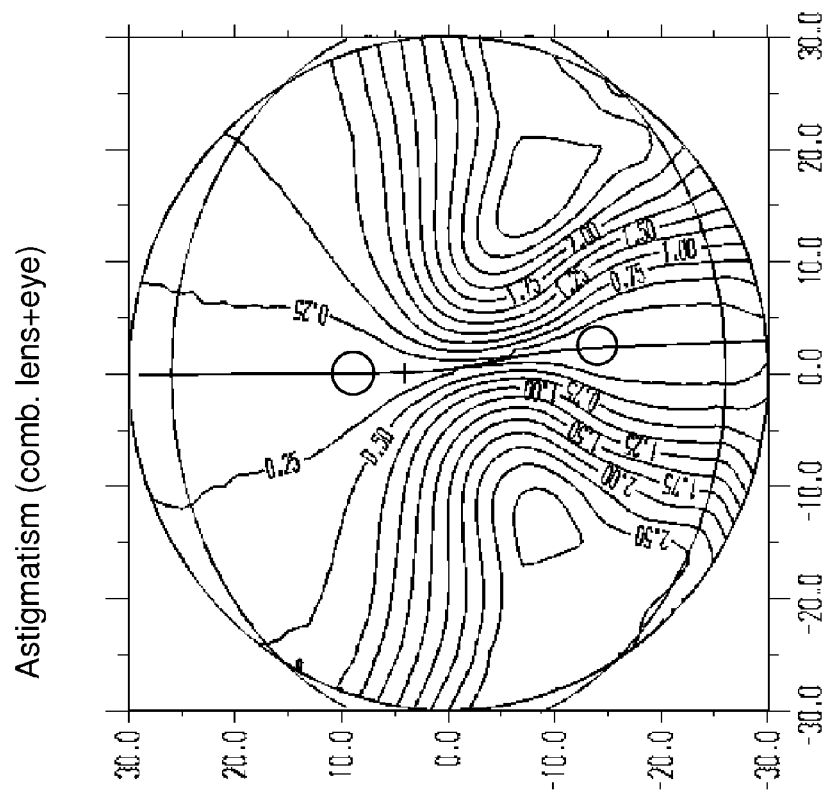
Figure 4C:
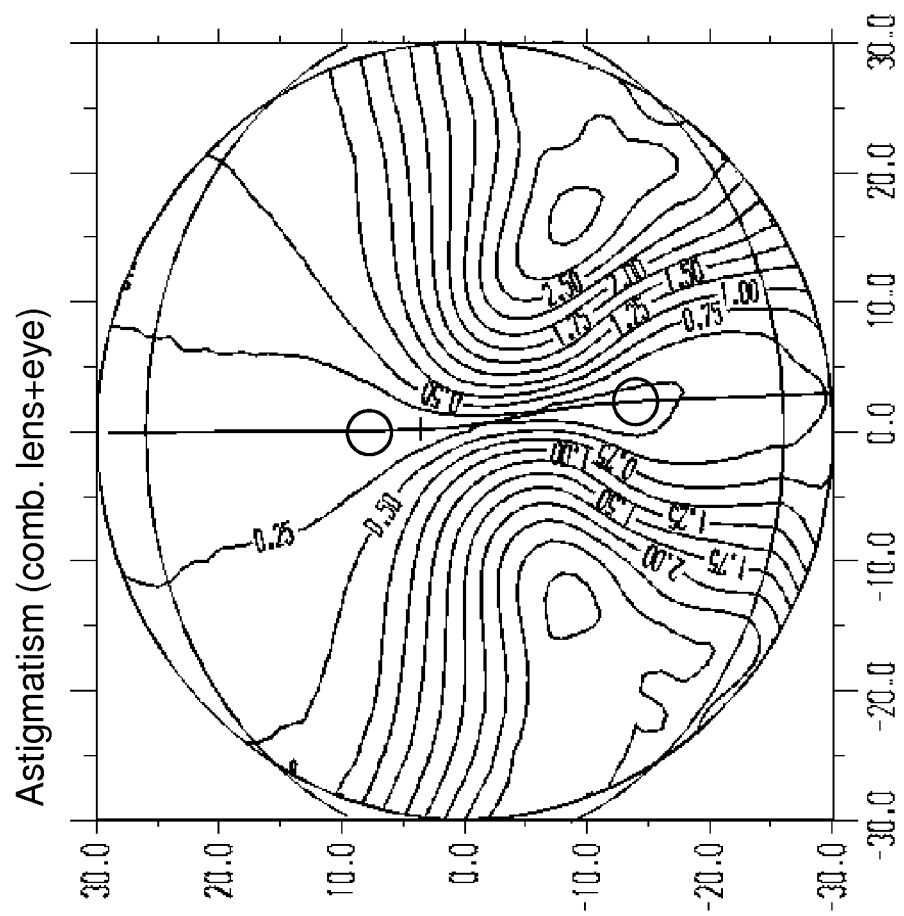

The invention will be described in the following by means of preferred embodiments with reference to the accompanying drawings, which show:

FIG. 1 a representation of Helmholtz coordinates according to a preferred embodiment of the invention;

FIGS. 2A and 2B schematic representations of a pair of eyes with parallel (FIG. 2A) and convergent (FIG. 2B) first and second viewing directions;

FIG. 3 a schematic representation of a pair of eyes for illustrating the convergence determination taking Prentice's rule into consideration;

FIGS. 4A to 4C isoastigmatism lines of the refraction deficit of a conventional spectacle lens in the case of an evaluation without transformation (FIG. 4A), an evaluation considering explicitly the viewing direction of the other eye, as described in WO 2010/054817 A1 (FIG. 4B), and an evaluation with a transformation of the cylinder axis according to the invention (FIG. 4C);

FIGS. 5A to 7B a course of the refraction deficit with respect to the refractive power (left curve) and the astigmatism (right curve) along the main line for different conventional single-vision lenses in the case of different evaluations (FIG. 5A to FIG. 5C, FIG. 6A to FIG. 6C, and FIG. 7A) and for lenses optimized according to the invention in the case of a transformation of the cylinder value (FIG. 5D, FIG. 6D, and FIG. 7B); and FIG. 8 a schematic representation of an example of a preferred device for optimizing and producing a spectacle lens or a spectacle lens pair according to the present invention.

FIG. 1 shows a graphic definition of Helmholtz coordinates for optimizing a spectacle lens or a spectacle lens pair according to a preferred embodiment of the invention. Dedicated Helmholtz coordinates could be introduced for each of the two eyes. In FIG. 1, this is shown exemplarily for only one eye. The ocularly fixed trihedron ($e_{x,H}, e_{y,H}, e_{z,H}$) of the eye results from the spatially fixed trihedron ($e_x, e_y, e_z$) by the following steps:
1. rotation about the x axis by the angle θ (first Helmholtz angle)
2. rotation about the new y axis by the angle −ϕ (second Helmholtz angle)
3. rotation about the new z axis by the angle ψ of the torsion.

Preferably, the z axis $e_z$ describes the direction of the eye-side main ray in the reference viewing direction, while the rotated z axis represents the direction of the eye-side main ray in the first or the second viewing direction.

FIG. 2A illustrates Listing's rule for distance vision. Both eyes have the same viewing angles θ and ϕ, and consequently also the same torsion angle $\psi_{Helmholtz}(\phi, \theta)$ in the Helmholtz representation according to equation (6). The Helmholtz coordinates relate to the spatially fixed trihedron ($e_x, e_y, e_z$), which is also drawn in FIG. 2A.

In particular for some viewing directions, it might be that the torsion angles $\psi^{(l)}$ and $\psi^{(r)}$ in the Helmholtz representation are different for the two eyes, so that the single images do not form on corresponding retina points any more, but on disparate retina points that are twisted to each other. This leads to a binocular double image and fusion disorders. This problem comes up in particular if the eye-side main rays for the left and right eyes are different. This is either the case for a convergence movement or can be caused by prisms in the lens, which are different for both eyes in the ray path used.

In such a case, the torsional movement of the eyes deviates from the specifications of Listing's rule L1, as this is shown in FIG. 2B, for example. FIG. 2B illustrates a modification of Listing's rule according to a preferred embodiment of the invention. The eyes converge, and thus the left eye has a different pair of viewing angles ($\phi^{(l)}, \theta^{(l)}$) than the right eye, which is described by ($\phi^{(r)}, \theta^{(r)}$). Accordingly, the torsion angles $\psi_{Helmholtz}(\phi, \theta)$ according to equation (6) are different, $\psi^{(l)} \neq \psi^{(r)}$. The Helmholtz coordinates relate to the spatially fixed trihedron ($e_x, e_y, e_z$), which is drawn in FIG. 2B.

Different spectacle lenses will now be compared in FIG. 4 to FIG. 7, which have each been optimized in different ways, the result of the optimization step having been evaluated in different ways.

FIGS. 4A to 4C particularly illustrate the efficiency of the transformation of the cylinder axis according to an aspect of the invention. They illustrate isoastigmatism lines of the refraction deficit of a spectacle lens optimized without a transformation of the astigmatic refraction in the case of an evaluation without transformation (FIG. 4A), a conventional method considering the viewing direction of the other eye, as described in WO 2010/054817 A1 (FIG. 4B), and an evaluation with a transformation of the cylinder axis according to the invention (FIG. 4C). While a difference can be seen between the conventional methods without transformation and the other two methods, the transformation according to the invention achieves an equally good effect as the calculation according to WO 2010/054817 A1, but with considerably less computing effort.

FIG. 5 to FIG. 7 illustrate the efficiency of the transformation of the cylinder value according to preferred embodiments of the invention for at least partly compensating for the adjustment astigmatism.

Figure 5D:
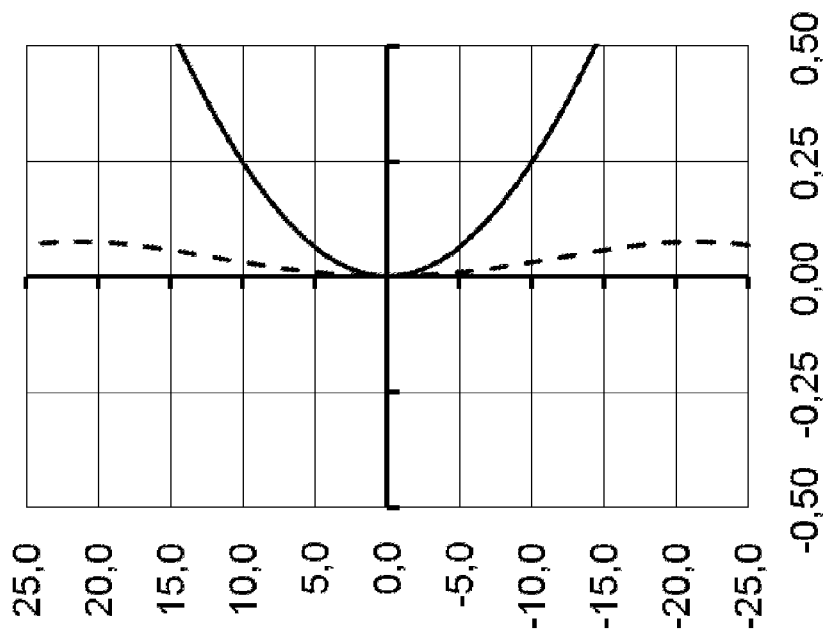
Figure 5C:
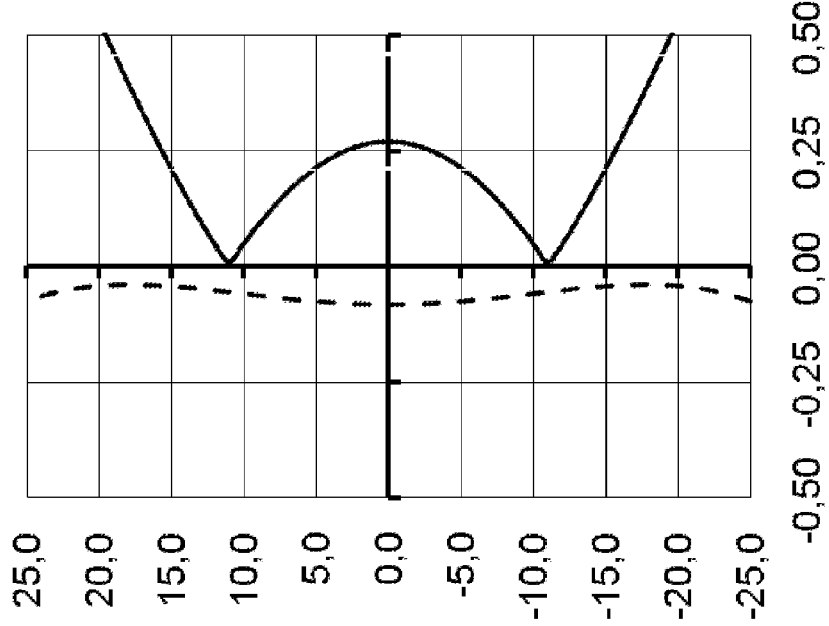

Here, FIGS. 5A to 5C show the course of the refraction deficit with respect to the refractive power (left curve) and the astigmatism (right curve) along the main line for a conventional single-vision lens in the case of different evaluations. Specifically, it is a single-vision lens optimized conventionally for a spherical power of +2 dpt and a cylindrical power of +3 dpt specified by the prescription data. FIG. 5A illustrates the refraction deficit in the case of a conventional evaluation for an infinite object distance. A corresponding evaluation for a finite object distance of 40 cm is illustrated in FIG. 5B. Without the adjustment astigmatism being considered, the astigmatic error remains corrected at the optical axis. Only the low amplitude of accommodation with corrective lens appears as a small negative refractive error. FIG. 5C shows an evaluation of the same lens at an object distance of 40 cm, but with the adjustment astigmatism being considered. With the adjustment astigmatism being considered, the astigmatic error effective at the optical axis becomes visible now. An astigmatic SV lens cannot be fully correcting for near and distance vision at the same time. Finally, FIG. 5D shows a single-vision lens optimized according to a preferred embodiment of the invention with a transformation of the cylinder value, for the same prescription with an evaluation for an object distance of again 40 cm.

FIG. 6A to 6D shows analogous illustrations of a lens optimized for the same prescription values according to the series "Impression Mono" by Rodenstock. FIG. 6A also illustrates the refraction deficit with a conventional evaluation for an infinite object distance. A corresponding evaluation for a finite object distance of 40 cm is shown in FIG. 6B. Without the adjustment astigmatism being considered, the astigmatic error remains corrected at the optical axis. The quality of image formation is good for near objects as well. FIG. 6C shows an evaluation of the same lens at an object distance of 40 cm, but with the adjustment astigmatism being considered. Again, with the adjustment astigmatism being considered, the astigmatic error effective at the optical axis becomes visible now. An astigmatic SV lens cannot be fully correcting for near and distance vision at the same time. Finally, FIG. 6D shows a single-vision lens optimized according to a preferred embodiment of the invention with a transformation of the cylinder value, for the same prescription with an evaluation for an object distance of again 40 cm.

FIGS. 7A and 7B compare a conventionally optimized progressive lens and a progressive lens of the series "FreeSign" by Rodenstock optimized according to the invention. The underlying prescription data specify a spherical power of −1 dpt, a cylindrical power of 3 dpt, and an addition of 1 dpt. FIG. 7A shows the course of the refraction deficit with respect to the refractive power (left curve) and the astigmatism (right curve) along the main line for a conventional single-vision lens in the case of an evaluation considering the adjustment astigmatism. In the distance zone, the adjustment astigmatism does not make itself felt due to the missing accommodation. In the near zone, an astigmatic error of approximately ⅛ dpt can be seen. In contrast, FIG. 7B shows a progressive lens optimized according to a preferred embodiment of the invention with a transformation of the cylinder value.

As is schematically illustrated in FIG. 8, a computer program product (i.e. a computer program claimed in the patent category of an apparatus) 200 is further provided, which is adapted such that, when loaded and executed on a suitable computer 100 or network, it can perform a method for optimizing or producing at least one spectacle lens pair to be used in spectacles for a specific wearing situation. The computer program product 200 can be stored on a physical storage medium or program carrier 120. The computer program product can further be provided as a program signal.

A possible computer or network architecture will be described in the following with reference to FIG. 8. The processor 110 of the computer 100 is a central processor (CPU), a microcontroller (MCU), or a digital signal processor (DSP), for example. The memory 120 symbolizes elements storing data and commands either in a temporally limited or permanent fashion. Even though the memory 120 is shown as a part of the computer 100 for the sake of better understanding, the storage function can be implemented elsewhere, e.g. in the processor itself (e.g. cache, register) and/or also in the network 300, for example in the computers 101/102. The memory 120 may be a Read-Only Memory (ROM), a Random-Access Memory (RAM), a programmable or non-programmable PROM, or a memory with other access options. The memory 120 can physically be implemented or stored on a computer-readable program carrier, for example on:

(a) a magnetic carrier (hard disk, floppy disk, magnetic tape);
(b) an optical carrier (CD-ROM, DVD);
(c) a semiconductor carrier (DRAM, SRAM, EPROM, EEPROM).

Optionally, the memory 120 is distributed across different media. Parts of the memory 120 can be attached in a fixed or exchangeable manner. The computer 100 uses known means, such as floppy-disk drives etc., for reading and writing.

The memory 120 stores support components, such as a Bios (Basic Input Output System), an operating system (OS), a program library, a compiler, an interpreter and/or a spreadsheet or word processing program. These components are not illustrated for the sake of better understanding. Support components are commercially available and can be installed or implemented on the computer 100 by experts.

The processor 110, the memory 120, the input and output devices are connected via at least one bus 130 and/or are optionally coupled via the (mono, bi, or multi-directional) network 300 (e.g. the Internet) or are in communication with each other. The bus 130 and the network 300 represent logical and/or physical connections, which transmit both commands and data signals. The signals within the computer 100 are mainly electrical signals, whereas the signals in the network may be electrical, magnetic and/or optical signals or also wireless radio signals.

Network environments (such as the network 300) are common in offices, company-wide computer networks, Intranets, and on the Internet (i.e. World Wide Web). The physical distance between the computers in the network does not have any significance. The network 300 may be a wireless or wired network. Possible examples for implementations of the network 300 are: a Local Area Network (LAN), a Wireless Local Area Network (WLAN), a Wide Area Network (WAN), an ISDN network, an infrared link (IR), a radio link, such as the Universal Mobile Telecommunication System (UMTS) or a satellite link. Transmission protocols and data formats are known. Examples are: TCP/IP (Transmission Control Protocol/Internet Protocol), HTTP (Hypertext Transfer Protocol), URL (Unique Resource Locator), HTML (Hypertext Markup Language), XML (Extensible Markup Language), WML (Wireless Application Markup Language), Wireless Application Protocol (WAP), etc.

The input and output devices may be part of a user interface 160. The input device 140 is a device that provides data and instructions to be processed by the computer 100. For example, the input device 140 is a keyboard, a pointing device (mouse, trackball, cursor arrows), microphone, joystick, scanner. Even though the examples are all devices with human interaction, preferably via a graphical user interface, the device 140 can also do without human interaction, such as a wireless receiver (e.g. by means of a satellite or terrestrial antenna), a sensor (e.g. a thermometer), a counter (e.g. a piece counter in a factory). The input device 140 can be used for reading the storage medium or carrier 170.

The output device 150 designates a device displaying instructions and data that have already been processed. Examples are a monitor or a different display (cathode ray tube, flat screen, liquid crystal display, loudspeakers, printer, vibrating alert). Similar to the input device 140, the output device 150 preferably communicates with the user, preferably via a graphical user interface. The output device may also communicate with other computers 101, 102, etc.

The input device 140 and the output device 150 can be combined in one single device. Both devices 140, 150 can be provided optionally.

The computer program product 200 comprises program instructions and optionally data causing the processor 110, among others, to perform the method steps of the method according to the invention or a preferred embodiment thereof. In other words, the computer program 200 defines the function of the computer 100 and its interaction with the network system 300. For example, the computer program product 200 can be provided as a source code in an arbitrary programming language and/or as a binary code in a compiled form (i.e. machine-readable form). A skilled person is able to use the computer program product 200 in conjunction with any of the above-explained support components (e.g. compiler, interpreter, operating system).

Even though the computer program product 200 is shown as being stored in the memory 120, the computer program product 100 may as well be stored elsewhere (e.g. on the storage medium or program carrier 170).

The storage medium 170 is exemplarily shown to be external to the computer 100. In order to transfer the computer program product 200 to the computer 100, the storage medium 170 can be inserted into the input device 140. The storage medium 170 can be implemented as an arbitrary computer-readably carrier, for example as one of the above-explained media (cf. memory 120). The program signal 180, which is preferably transferred to the computer 100 via the network 300, can also include the computer program product 200 or be a part of it.

Interfaces for coupling the individual components of the computer system 50 are also known. The interfaces are not shown for the sake of simplification. An interface can e.g. have a serial interface, a parallel interface, a gameport, a universal serial bus (USB), an internal or external modem, a graphics adapter and/or a soundcard.

It is particularly possible to transfer prescription data of the spectacle lenses preferably together with individual data of the spectacles wearer (including the data of the individual wearing situation) and/or data of the spectacle lens (refractive index, vertex depths of the front and back surfaces) to a device for producing a spectacle lens according to the invention preferably by means of data remote transfer. Then, the optimization of the spectacle lens is preferably performed on the basis of the transmitted prescription data and individual data.

REFERENCE NUMERAL LIST 50 computer system
100, 101, 102 computer
110 processor
120 memory
130 bus
140 input device
150 output device
160 user interface
170 storage medium
180 program signal
200 computer program product
300 network

The invention claimed is:

1. A method for optimizing and producing a spectacle lens for a specific wearing situation for correcting at least one astigmatic refraction of an eye of a spectacles wearer, which in a reference viewing direction $-e_z$ of the eye has a cylinder reference value $Z_0$ and a cylinder reference axis $\alpha_0$, comprising a calculation and optimization step of the spectacle lens, the method comprising:

specifying an object distance $a_i$ for at least one evaluation point $i_b$ of the spectacle lens;

determining a transformed astigmatic refraction for the at least one evaluation point $i_b$ of the spectacle lens from the cylinder reference value $Z_0$ and the cylinder reference axis $\alpha_0$ depending on the specified object distance $a_i$; and optimizing the spectacle lens such that for the at least one evaluation point $i_b$ a correction of the transformed astigmatic refraction by the spectacle lens in the specific wearing situation is taken into consideration, wherein determining the transformed astigmatic refraction comprises determining a transformed cylinder value $Z_i$ and/or a transformed cylinder axis $\alpha_i$ depending on the specified object distance $a_i$;

wherein the transformed cylinder value $Z_i$ depends on a distance e between the spectacle lens and the principal plane of the eye, and on a sphere $S_0$, determined for the reference viewing direction $-e_z$, of the refraction of the eye to be corrected, according to $$Z_i = Z_0 + e\left(\mathrm{Add} + \frac{1}{a_i}\right)\left(-2 + e\left(\mathrm{Add} + \frac{1}{a_i} - 2S_0 - Z_0\right)\right)Z_0,$$

wherein Add designates a refractive power increase from the reference viewing direction $-e_z$ to a viewing direction $-e_\zeta$ of the eye corresponding to the at least one evaluation point $i_b$, and wherein the transformed cylinder axis $\alpha_i$ encloses a correction torsion angle $\psi_K$ with a torsion reference axis $e_L$ that is perpendicular both to the reference viewing direction $-e_z$ and to a viewing direction $-e_\zeta$ of the eye corresponding to the at least one evaluation point $i_b$, said correction torsion angle $\psi_K$ deviating from a reference torsion angle $\psi_0$ between the cylinder reference axis $\alpha_0$ and the torsion reference axis $e_L$ by a torsion correction angle $$\psi_\Delta = \frac{(\sin\vartheta)\Delta\varphi}{1 + \cos\vartheta\cos\left(\varphi + \frac{\Delta\varphi}{2}\right)},$$

which depends on the first Helmholtz angle θ and on the second Helmholtz angle ϕ of the viewing direction $-e_\zeta$ of the eye corresponding to the at least one evaluation point $i_b$ as well as on a convergence angle Δϕ according to $$\Delta\varphi = -\frac{PD - a_i(\Delta d_y S_{xy} + \Delta Pr_0)}{a_i - b'(1 + a_i S_{xx})}$$

in dependence on a pupillary distance PD of the spectacles wearer, a distance between center of rotation and lens vertex b', and components $S_{xx}$ and $S_{xy}$ of a refractive power matrix $$S = \begin{pmatrix} S_{xx} & S_{xy} \\ S_{xy} & S_{yy} \end{pmatrix}$$

of the spectacle lens, wherein the value $\Delta Pr_0$ designates a prismatic power and the value $\Delta d_y$ designates a difference of the vertical infraduction between left and right eyes.

2. The method according to claim 1, wherein the reference viewing direction $-e_z$ of the eye corresponds to the zero viewing direction of the spectacles wearer, and the at least one evaluation point $i_b$ of the spectacle lens corresponds to a near reference point of the spectacle lens.

3. The method according to claim 1, wherein in the case of determining a transformed cylinder value $Z_i$, the method further comprises determining a transformed sphere $S_i$, which according to $$S_i = S_0 + \frac{(Z_0 - Z_i)}{2} + Add + e^2\left(Add + \frac{1}{a_i}\right)Z_0^2$$

depends on the transformed cylinder value $Z_i$, and wherein the spectacle lens is optimized such that for the at least one evaluation point $i_b$, a correction of the transformed sphere $S_i$ by the spectacle lens in the specific wearing situation is taken into consideration.

4. The method according to claim 1, wherein in the case of determining a transformed cylinder axis $\alpha_i$, it is determined such that the torsion correction angle $\psi_A$ depends on the convergence angle Δϕ according to $$\Delta\varphi = -\frac{PD - a_i \Delta Pr_0}{a_i - b'(1 + a_i S)}$$

in dependence on the pupillary distance PD of the spectacles wearer, a distance between center of rotation and lens vertex b', and a spherical power S of the spectacle lens, wherein the value $\Delta Pr_0$ designates a prismatic power.

5. The method according to claim 1, wherein in the case of determining a transformed cylinder axis $\alpha_i$, it is determined such that the value $\Delta Pr_0$ of the prismatic power corresponds to the difference of the horizontal components of prismatic prescriptions for the left and right eyes.

6. The method according to claim 1, wherein in the case of determining a transformed cylinder axis $\alpha_i$, it is determined such that the torsion correction angle $\psi_A$ depends on the convergence angle Δϕ according to $$\Delta\varphi = \frac{PD}{a_i - b'(1 + a_i S)}$$

in dependence on the pupillary distance PD of the spectacles wearer, the distance between center of rotation and lens vertex b', and a spherical power S of the spectacle lens.

7. The method according to claim 1, wherein in the case of determining a transformed cylinder axis $\alpha_i$, it is determined such that a spherocylindrical power $S_0$ of the prescription for the spectacles wearer is used as the refractive power matrix $$S = \begin{pmatrix} S_{xx} & S_{xy} \\ S_{xy} & S_{yy} \end{pmatrix}$$

of the spectacle lens.

8. The method according to claim 1, wherein in the case of determining a transformed cylinder axis $\alpha_i$, it is determined such that a spherocylindrical power $S_i$ at the evaluation point $i_b$ is used as the refractive power matrix $$S = \begin{pmatrix} S_{xx} & S_{xy} \\ S_{xy} & S_{yy} \end{pmatrix}$$

of the spectacle lens.

9. The method according to claim 8, wherein in the case of determining a transformed cylinder axis $\alpha_i$, it is determined such that a mean value between the spherocylindrical power $S_i$ at the evaluation point $i_b$ and the spherocylindrical power at a reference point of the spectacle lens, in particular the prism reference point or the distance reference point, is used as the refractive power matrix $$S = \begin{pmatrix} S_{xx} & S_{xy} \\ S_{xy} & S_{yy} \end{pmatrix}$$

of the spectacle lens.

10. A computer program product including program parts, which, when loaded and executed on a computer, are adapted to perform a method for optimizing a spectacle lens for a specific wearing situation for correcting at least one astigmatic refraction of an eye of a spectacles wearer, which in a reference viewing direction $-e_z$ of the eye has a cylinder reference value $Z_0$ and a cylinder reference axis $\alpha_0$, comprising a calculation and optimization step of the spectacle lens, the method comprising:
  specifying an object distance $a_i$ for at least one evaluation point $i_b$ of the spectacle lens;
  determining a transformed astigmatic refraction for the at least one evaluation point $i_b$ of the spectacle lens from the cylinder reference value $Z_0$ and the cylinder reference axis $\alpha_0$ depending on the specified object distance $a_i$; and
  optimizing the spectacle lens such that for the at least one evaluation point $i_b$ a correction of the transformed astigmatic refraction by the spectacle lens in the specific wearing situation is taken into consideration,
  wherein determining the transformed astigmatic refraction comprises determining a transformed cylinder value $Z_i$ and/or a transformed cylinder axis $\alpha_i$, depending on the specified object distance $a_i$;

wherein the transformed cylinder value $Z_i$ depends on a distance e between the spectacle lens and the principal plane of the eye, and on a sphere $S_0$, determined for the reference viewing direction $-e_z$, of the refraction of the eye to be corrected, according to $$Z_i = Z_0 + e\left(\text{Add} + \frac{1}{a_i}\right)\left(-2 + e\left(\text{Add} + \frac{1}{a_i} - 2S_0 - Z_0\right)\right)Z_0,$$

wherein Add designates a refractive power increase from the reference viewing direction $-e_z$ to a viewing direction $-e_\zeta$ of the eye corresponding to the at least one evaluation point $i_b$, and wherein the transformed cylinder axis $\alpha_i$, encloses a correction torsion angle $\psi_K$ with a torsion reference axis $e_L$ that is perpendicular both to the reference viewing direction $-e_z$ and to a viewing direction $-e_\zeta$ of the eye corresponding to the at least one evaluation point $i_b$, said correction torsion angle $\psi_K$ deviating from a reference torsion angle $\psi_0$ between the cylinder reference axis $\alpha_0$ and the torsion reference axis $e_L$ by a torsion correction angle $$\psi_\Delta = \frac{(\sin\vartheta)\Delta\varphi}{1 + \cos\vartheta\cos\left(\varphi + \frac{\Delta\varphi}{2}\right)},$$

which depends on the first Helmholtz angle $\theta$ and on the second Helmholtz angle $\phi$ of the viewing direction $-e_\zeta$ of the eye corresponding to the at least one evaluation point $i_b$ as well as on a convergence angle $\Delta\phi$ according to $$\Delta\varphi = -\frac{PD - a_i(\Delta d_y S_{xy} + \Delta Pr_0)}{a_i - b'(1 + a_i S_{xx})}$$

in dependence on a pupillary distance PD of the spectacles wearer, a distance between center of rotation and lens vertex b', and components $S_{xx}$ and $S_{xy}$ of a refractive power matrix $$S = \begin{pmatrix} S_{xx} & S_{xy} \\ S_{xy} & S_{yy} \end{pmatrix}$$

of the spectacle lens, wherein the value $\Delta Pr_0$ designates a prismatic power and the value $\Delta d_y$ designates a difference of the vertical infraduction between left and right eyes.

11. A storage medium with a computer program stored thereon, said computer program being adapted, when loaded and executed on a computer, to perform a method for optimizing a spectacle lens for a specific wearing situation for correcting at least one astigmatic refraction of an eye of a spectacles wearer, which in a reference viewing direction $-e_z$ of the eye has a cylinder reference value $Z_0$ and a cylinder reference axis $\alpha_0$, comprising a calculation and optimization step of the spectacle lens, the method comprising:

specifying an object distance $a_i$ for at least one evaluation point $i_b$ of the spectacle lens;

determining a transformed astigmatic refraction for the at least one evaluation point $i_b$ of the spectacle lens from the cylinder reference value $Z_0$ and the cylinder reference axis $\alpha_0$ depending on the specified object distance $a_i$; and optimizing the spectacle lens such that for the at least one evaluation point $i_b$ a correction of the transformed astigmatic refraction by the spectacle lens in the specific wearing situation is taken into consideration, wherein determining the transformed astigmatic refraction comprises determining a transformed cylinder value $Z_i$ and/or a transformed cylinder axis $\alpha_i$, depending on the specified object distance $a_i$;

wherein the transformed cylinder value $Z_i$ depends on a distance e between the spectacle lens and the principal plane of the eye, and on a sphere $S_0$, determined for the reference viewing direction $-e_z$, of the refraction of the eye to be corrected, according to $$Z_i = Z_0 + e\left(\text{Add} + \frac{1}{a_i}\right)\left(-2 + e\left(\text{Add} + \frac{1}{a_i} - 2S_0 - Z_0\right)\right)Z_0,$$

wherein Add designates a refractive power increase from the reference viewing direction $-e_z$ to a viewing direction $-e_\zeta$ of the eye corresponding to the at least one evaluation point $i_b$ and wherein the transformed cylinder axis $\alpha_i$, encloses a correction torsion angle $\psi_K$ with a torsion reference axis $e_L$ that is perpendicular both to the reference viewing direction $-e_z$ and to a viewing direction $-e_\zeta$ of the eye corresponding to the at least one evaluation point $i_b$, said correction torsion angle $\psi_K$ deviating from a reference torsion angle $\psi_0$ between the cylinder reference axis $\alpha_0$ and the torsion reference axis $e_L$ by a torsion correction angle $$\psi_\Delta = \frac{(\sin\vartheta)\Delta\varphi}{1 + \cos\vartheta\cos\left(\varphi + \frac{\Delta\varphi}{2}\right)},$$

which depends on the first Helmholtz angle $\theta$ and on the second Helmholtz angle $\phi$ of the viewing direction $-e_\zeta$ of the eye corresponding to the at least one evaluation point $i_b$ as well as on a convergence angle $\Delta\phi$ according to $$\Delta\varphi = -\frac{PD - a_i(\Delta d_y S_{xy} + \Delta Pr_0)}{a_i - b'(1 + a_i S_{xx})}$$

in dependence on a pupillary distance PD of the spectacles wearer, a distance between center of rotation and lens vertex b', and components $S_{xx}$ and $S_{xy}$ of a refractive power matrix $$S = \begin{pmatrix} S_{xx} & S_{xy} \\ S_{xy} & S_{yy} \end{pmatrix}$$

of the spectacle lens, wherein the value $\Delta Pr_0$ designates a prismatic power and the value $\Delta d_y$ designates a difference of the vertical infraduction between left and right eyes.

12. A device for producing at least one spectacle lens, wherein the device comprises:

obtaining means for obtaining target data of at least one spectacle lens;

calculation and optimization means for calculating and optimizing a spectacle lens for a specific wearing situation for correcting at least one astigmatic refraction of an eye of a spectacles wearer, which in a reference viewing direction $-e_z$ of the eye has a cylinder reference value $Z_0$ and a cylinder reference axis $\alpha_0$, wherein the calculation and optimization are performed such as to comprise a calculation and optimization step of the spectacle lens, by:

specifying an object distance $a_i$ for at least one evaluation point $i_b$ of the spectacle lens;

determining a transformed astigmatic refraction for the at least one evaluation point $i_b$ of the spectacle lens from the cylinder reference value $Z_0$ and the cylinder reference axis $\alpha_0$ depending on the specified object distance $a_i$; and optimizing the spectacle lens such that for the at least one evaluation point $i_b$ a correction of the transformed astigmatic refraction by the spectacle lens in the specific wearing situation is taken into consideration, wherein determining the transformed astigmatic refraction comprises determining a transformed cylinder value $Z_i$ and/or a transformed cylinder axis $\alpha_i$, depending on the specified object distance $a_i$;

wherein the transformed cylinder value $Z_i$ depends on a distance e between the spectacle lens and the principal plane of the eye, and on a sphere $S_0$, determined for the reference viewing direction $-e_z$, of the refraction of the eye to be corrected, according to $$Z_i = Z_0 + e\left(\text{Add} + \frac{1}{a_i}\right)\left(-2 + e\left(\text{Add} + \frac{1}{a_i} - 2S_0 - Z_0\right)\right)Z_0,$$

wherein Add designates a refractive power increase from the reference viewing direction $-e_z$ to a viewing direction $-e_\varsigma$ of the eye corresponding to the at least one evaluation point $i_b$ and wherein the transformed cylinder axis $\alpha_i$, encloses a correction torsion angle $\psi_K$ with a torsion reference axis $e_L$ that is perpendicular both to the reference viewing direction $-e_z$ and to a viewing direction $-e_\varsigma$ of the eye corresponding to the at least one evaluation point $i_b$, said correction torsion angle $\psi_K$ deviating from a reference torsion angle $\psi_0$ between the cylinder reference axis $\alpha_0$ and the torsion reference axis $e_L$ by a torsion correction angle $$\psi_\Delta = \frac{(\sin\vartheta)\Delta\varphi}{1 + \cos\vartheta\cos\left(\varphi + \frac{\Delta\varphi}{2}\right)},$$

which depends on the first Helmholtz angle $\theta$ and on the second Helmholtz angle $\phi$ of the viewing direction $-e_\varsigma$ of the eye corresponding to the at least one evaluation point $i_b$ as well as on a convergence angle $\Delta\phi$ according to $$\Delta\varphi = -\frac{PD - a_i(\Delta d_y S_{xy} + \Delta Pr_0)}{a_i - b'(1 + a_i S_{xx})}$$

in dependence on a pupillary distance PD of the spectacles wearer, a distance between center of rotation and lens vertex b', and components $S_{xx}$ and $S_{xy}$ of a refractive power matrix $$S = \begin{pmatrix} S_{xx} & S_{xy} \\ S_{xy} & S_{yy} \end{pmatrix}$$

of the spectacle lens, wherein the value $\Delta Pr_0$ designates a prismatic power and the value $\Delta d_y$ designates a difference of the vertical infraduction between left and right eyes.

* * * * *